(12) United States Patent
Li et al.

(10) Patent No.: US 11,735,771 B2
(45) Date of Patent: Aug. 22, 2023

(54) ELECTROLYTE SOLUTION AND ELECTROCHEMICAL DEVICE USING THE SAME

(71) Applicant: NINGDE AMPEREX TECHNOLOGY LIMITED, Ningde (CN)

(72) Inventors: Wenqiang Li, Ningde (CN); Shuirong Zhang, Ningde (CN); Chunrui Xu, Ningde (CN); Juan Ma, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 268 days.

(21) Appl. No.: 16/652,468

(22) PCT Filed: Jan. 20, 2020

(86) PCT No.: PCT/CN2020/073174
§ 371 (c)(1),
(2) Date: Mar. 31, 2020

(87) PCT Pub. No.: WO2020/151647
PCT Pub. Date: Jul. 30, 2020

(65) Prior Publication Data
US 2021/0257662 A1 Aug. 19, 2021

(30) Foreign Application Priority Data
Jan. 25, 2019 (CN) .......................... 201910072888.2

(51) Int. Cl.
*H01M 10/0567* (2010.01)
*H01M 10/0525* (2010.01)
*H01M 10/0569* (2010.01)

(52) U.S. Cl.
CPC ... *H01M 10/0567* (2013.01); *H01M 10/0525* (2013.01); *H01M 10/0569* (2013.01); *H01M 2300/0042* (2013.01)

(58) Field of Classification Search
None
See application file for complete search history.

(56) References Cited

U.S. PATENT DOCUMENTS

| 6,379,846 | B1 * | 4/2002 | Terahara | ............. | H01M 10/052 |
| | | | | | 429/344 |
| 9,847,549 | B2 | 12/2017 | Lee et al. | | |
| 9,979,049 | B2 | 5/2018 | Kim et al. | | |
| 10,424,813 | B2 | 9/2019 | Ohashi et al. | | |

| 2005/0221195 | A1 | 10/2005 | Uchida et al. | |
| 2016/0294007 | A1 * | 10/2016 | Kefei | ................ H01M 10/4235 |
| 2017/0288257 | A1 * | 10/2017 | Kil | ...................... H01M 10/052 |

FOREIGN PATENT DOCUMENTS

| CN | 1840550 | A | 10/2006 |
| CN | 102394314 | A | 3/2012 |
| CN | 102484281 | A | 5/2012 |
| CN | 104649932 | A | 5/2015 |
| CN | 105074993 | A | 11/2015 |
| CN | 105355968 | A | 2/2016 |
| CN | 105514487 | A | 4/2016 |
| CN | 105591158 | A | 5/2016 |
| CN | 105703007 | A | 6/2016 |
| CN | 106785038 | A | 5/2017 |
| CN | 107359369 | A | 11/2017 |
| CN | 107408734 | A | 11/2017 |
| CN | 108242567 | A | 7/2018 |
| CN | 109004279 | A | 12/2018 |
| CN | 109119688 | A | 1/2019 |
| CN | 109244529 | A | 1/2019 |
| CN | 109346771 | A | 2/2019 |
| CN | 109786824 | A | 5/2019 |
| CN | 109786834 | A | 5/2019 |
| CN | 110380120 | A | 10/2019 |
| JP | 2017228426 | A | 12/2017 |
| WO | 2018120791 | A1 | 7/2018 |

OTHER PUBLICATIONS

Yim et al. ACS Appl. Mater. Interfaces, 2017, 9, 32851-32858. (Year: 2017).*
Machine translation of Du et al. (CN 109244529 A). (Year: 2021).*
International Search Report dated Mar. 26, 2020 in counterpart PCT application PCT/CN2020/073174, 5 pages.
"Research Progress in New-Type High Voltage Electrolyte used for Lithium Batteries," Zhang et al., Chemical Bulletin, vol. 80, No. 11, pp. 1021-1025, Nov. 18, 2017, 6 pages in Chinese with English abstract.
"Review of electrolyte additives for ternary cathode battery," Deng et al., Acta Chimica Sinica, vol. 76, No. 4, pp. 1-11, Apr. 15, 2018, 19 pages in Chinese with English abstract.
European Extended Search Report dated Dec. 2, 2022 in counterpart European application EP20712819.0, 8 pages in English.

* cited by examiner

*Primary Examiner* — Eli S Mekhlin
(74) *Attorney, Agent, or Firm* — Juan Carlos A. Marquez; Marquez IP Law Office, PLLC

(57) ABSTRACT

The present application relates to an electrolytic solution and an electrochemical device using same. The electrolytic solution of the present application comprises a compound containing a —CN functional group and a compound containing a P—O bond. By introducing the compound containing a —CN functional group and the compound containing a P—O bond into the electrolytic solution, an active material can be better protected, thereby effectively improving floatation performance and nailing performance of a battery, and cycle impedance of the battery.

17 Claims, No Drawings

ELECTROLYTE SOLUTION AND ELECTROCHEMICAL DEVICE USING THE SAME

The present application is a National Stage application of PCT international application: PCT/CN2020/073174 which claims the benefit of priority from the China Patent Application No. 201910072888.2, filed on 25 Jan. 2019, the disclosure of which is hereby incorporated by reference in its entirety.

BACKGROUND

1. Technical Field

This application relates to the field of electrochemical device technologies, and more particularly to an electrolytic solution and an electrochemical device using the same.

2. Description of the Related Art

With the popularization and application of intelligent electronic products such as mobile phones, notebook computers, and cameras, the safety of using such products in harsh environments has gradually gained the attention of the general public. As working power supplies of electronic products, lithium ion batteries, by replacing conventional Ni—Cd and MH-Ni batteries, have been widely applied in such products. However, as electronic products are developed to be lighter, thinner, and more portable, the requirements for lithium ion batteries have become increasingly higher. It has become an urgent task to develop a safe lithium ion battery which can resist high temperature and various adverse conditions. Especially, batteries on the market often swell, automatically turn off after being used for a period of time, or burn and explode. Therefore, the market has a much higher requirement for the safety performance of batteries during use. How to improve the safety of lithium ion batteries and increase impedance after use are difficult problems to be solved.

SUMMARY

The present application provides an electrolytic solution and an electrochemical device using the same, to attempt to solve at least one problem in the related field at least to a certain extent.

According to some embodiments, the present application provides an electrolytic solution, which includes a compound containing a —CN functional group and a compound containing a P—O bond, wherein the compound containing a —CN functional group includes at least one of a compound represented by formula I-A:

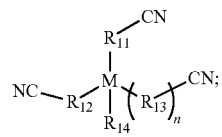

(I-A)

M is at least one selected from the group consisting of N, P, C, and Si;

$R_{11}$, $R_{12}$, and $R_{13}$ are each independently selected from a substituted or non-substituted $C_1$-$C_{12}$ alkylene group, a substituted or non-substituted $C_2$-$C_{12}$ alkenylene group, an $R_0$—S—R group, or an $R_0$—O—R group, $R_0$ and R being each independently selected from a substituted or non-substituted $C_1$-$C_6$ alkylene group;

n is selected from 0 or 1;

$R^{14}$ is selected from H, fluorine, a cyano group, a substituted or non-substituted $C_1$-$C_{12}$ alkyl group, a substituted or non-substituted $C_2$-$C_{12}$ alkenyl group, an $R_0$—S—R group, or an $R_0$—O—R group, $R_0$ and R being a substituted or non-substituted $C_1$-$C_6$ alkyl group; when being substituted, a substituent is selected from a halogen, a cyano group, a $C_1$-$C_6$ alkyl group, a $C_2$-$C_6$ alkenyl group, or any combination thereof; and when M is N or P, only three of $R_{11}$, $R_{12}$, $R_{13}$, and $R_{14}$ are present.

According to some embodiments, the compound containing a P—O bond includes at least one of a compound represented by formula II-A or compounds represented by II-B:

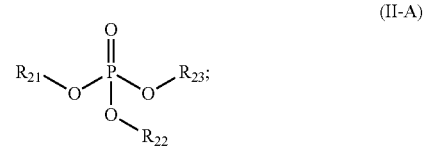

(II-A)

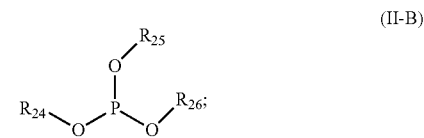

(II-B)

wherein $R_{21}$, $R_{22}$, $R_{23}$, $R_{24}$, $R_{25}$, and $R_{26}$ are each independently selected from $R^a$, Si—(R")$_3$ or R'—Si—(R")$_3$;

each of $R^a$ and R" is independently selected from a $C_1$-$C_{12}$ alkyl group, a $C_2$-$C_{12}$ alkenyl group, a $C_6$-$C_{10}$ cyclic hydrocarbon group, or a $C_6$-$C_{26}$ aryl group;

R' is selected from a $C_1$-$C_{12}$ alkylene group or a $C_2$-$C_{12}$ alkenylene group; and $R_{21}$, $R_{22}$, $R_{23}$, $R_{24}$, $R_{25}$, and $R_{26}$ are each independently substituted or non-substituted, and when being substituted, a substituent is selected from a halogen, a $C_1$-$C_6$ alkyl group, a $C_2$-$C_6$ alkenyl group, or any combination thereof.

According to some embodiments, at least one of $R_{21}$, $R_{22}$, $R_{23}$, $R_{24}$, $R_{25}$, and $R_{26}$ contains a Si atom.

According to some embodiments, the compound containing a —CN functional group includes at least one of the following compounds:

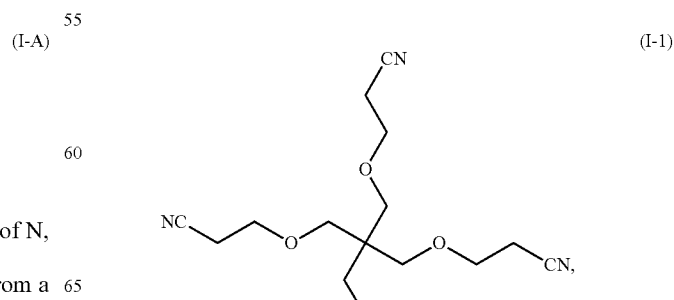

(I-1)

-continued
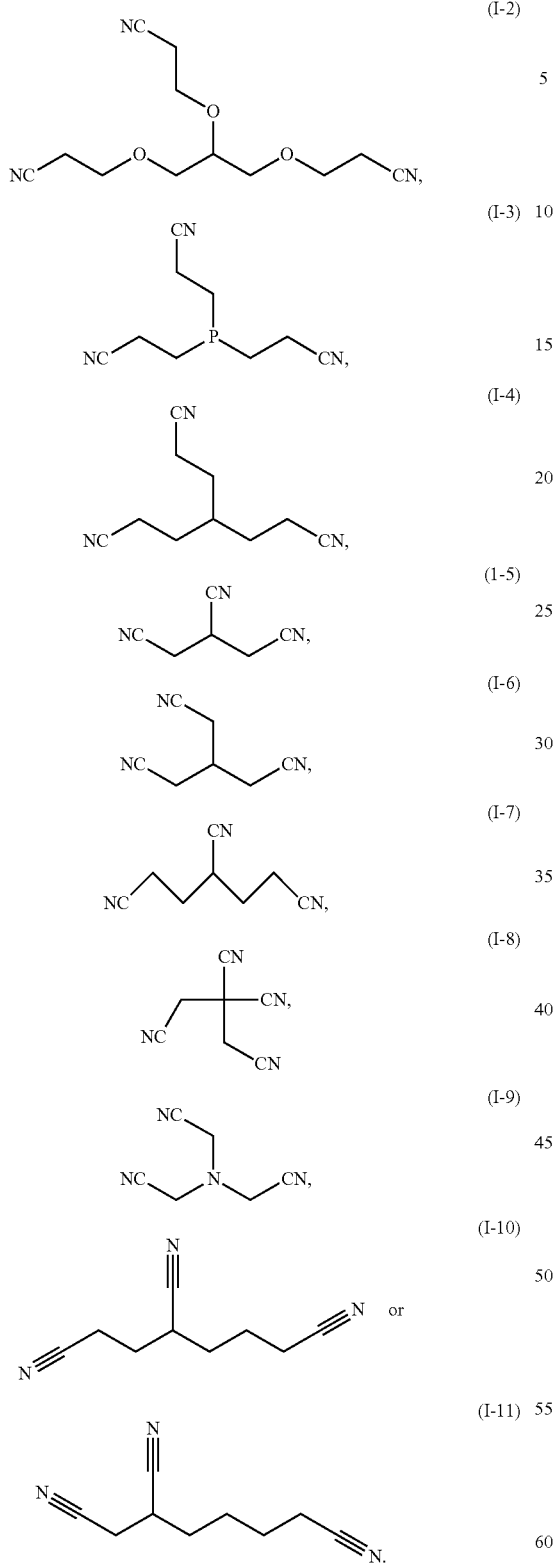
(I-2), (I-3), (I-4), (I-5), (I-6), (I-7), (I-8), (I-9), (I-10), (I-11)
According to some embodiments, the compound containing a P—O bond includes at least one of the following compounds:
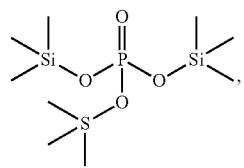 (II-1)
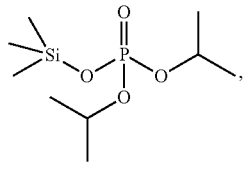 (II-2)
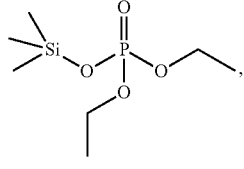 (II-3)
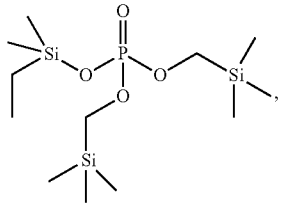 (II-4)
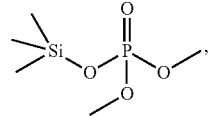 (II-5)
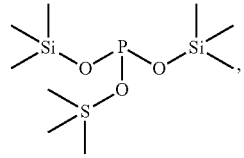 (II-6)
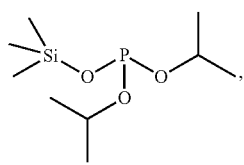 (II-7)
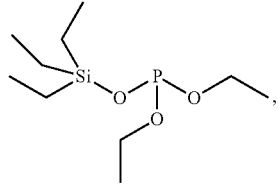 (II-8)
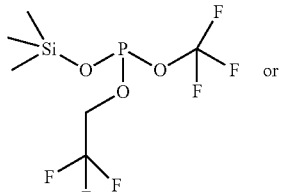 (II-9)

-continued

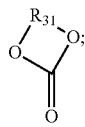
(II-10)

According to some embodiments, based on the total weight of the electrolytic solution, the weight percentage of the compound containing a —CN functional group is about 0.01 wt % to about 10 wt %, and the weight percentage of the compound containing a P—O bond is about 0.01 wt % to about 5 wt %.

According to some embodiments, the electrolytic solution further includes a cyclic carbonate, and the cyclic carbonate includes a compound represented by formula III-A:

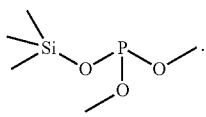
(III-A)

where $R_{31}$ is selected from a substituted or non-substituted $C_1$-$C_{12}$ alkylene group, or a substituted or non-substituted $C_2$-$C_{12}$ alkenylene group; and when being substituted, a substituent is selected from a halogen, a $C_1$-$C_6$ alkyl group, a $C_2$-$C_6$ alkenyl group or any combination thereof.

According to some embodiments, the cyclic carbonate includes at least one of the following compounds: fluoroethylene carbonate, vinylene carbonate, or vinylethylene carbonate.

According to some embodiments, based on the total weight of the electrolyte, the weight percentage of the cyclic carbonate is about 0.01 wt % to about 50 wt %.

According to some embodiments, the electrolyte further includes a carbonate compound containing a silicon functional group, and the carbonate compound containing a silicon functional group includes a compound represented by formula IV-A:

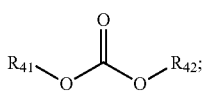
(IV-A)

where $R_{41}$ and $R_{42}$ are each independently selected from $R^a$, Si—(R")$_3$ or R'—Si—(R")$_3$, and at least one of $R_{41}$ and $R_{42}$ contains Si;

each of $R^a$ and R" is independently selected from H, a $C_1$-$C_{12}$ alkyl group, a $C_2$-$C_{12}$ alkenyl group, a $C_6$-$C_{10}$ cyclic hydrocarbon group or a $C_6$-$C_{26}$ aryl group;

R' is selected from a $C_1$-$C_{12}$ alkylene group or a $C_2$-$C_{12}$ alkenylene group; and $R_{41}$ and $R_{42}$ are each independently substituted or non-substituted, and when being substituted, a substituent is selected from a halogen, a $C_1$-$C_6$ alkyl group, a $C_2$-$C_6$ alkenyl group or any combination thereof.

According to some embodiments, the carbonate compound containing a silicon functional group includes at least one of the following compounds:

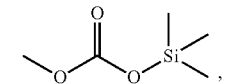
(formula IV-1)

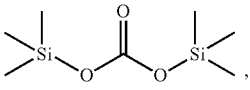
(formula IV-2)

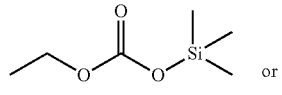
(formula IV-3)
or

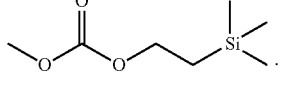
(formula IV-4)

According to some embodiments, based on the total weight of the electrolytic solution, the weight percentage of the carbonate compound containing a silicon functional group is about 0.01 wt % to about 50 wt %.

According to some embodiments, the electrolytic solution further includes a carboxylate, and the carboxylate includes a compound represented by formula V-A:

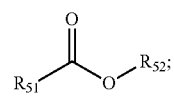
(V-A)

where $R_{51}$ and $R_{52}$ are each independently selected from a substituted or non-substituted $C_1$-$C_{12}$ alkyl group, or a substituted or non-substituted $C_2$-$C_{12}$ alkenyl group; and when being substituted, a substituent is selected from a halogen, a $C_1$-$C_6$ alkyl group, a $C_2$-$C_6$ alkenyl group or any combination thereof.

According to some embodiments, the carboxylate includes at least one of the following compounds: propylpropionate, trifluoroethylacetate or fluoroethylacetate.

According to some embodiments, based on the total weight of the electrolytic solution, the content of the carboxylate is about 0.01 wt % to about 60 wt %.

Another embodiment of the present application provides an electrochemical device, wherein the electrochemical device includes the electrolytic solution according to any of the foregoing embodiments.

Another embodiment of the present application provides an electronic device, wherein the electronic device includes the electronic device according to any of the foregoing embodiments.

The electrolytic solution of the present application includes a compound containing a —CN functional group and a compound containing a P—O bond, so that the stability of the electrolytic solution can be improved, and an active material can be protected, thereby effectively improving floatation performance and nailing performance of a battery, and cycle impedance of the battery.

Additional aspects and advantages of the embodiments of this application are partially described and displayed in the following description, or illustrated through the implementation of the embodiments of this application.

DETAILED DESCRIPTION

As used herein, the term "about" is used to describe and illustrate small changes. When used in connection with an event or a circumstance, the term may refer to an example in which the event or circumstance occurs precisely, and an example in which the event or circumstance occurs approximately. For example, when used in connection with a value, the term "about" may refer to a range of variation less than or equal to 10% of the stated value, such as less than or equal to ±5%, less than or equal to ±4%, less than or equal to ±3%, less than or equal to 2%, less than or equal to 1%, less than or equal to 0.5%, less than or equal to 0.1%, or less than or equal to 0.05%.

In addition, amounts, ratios, and other values are sometimes presented in a range format in this application. It is to be understood that such a range format is provided for the sake of convenience and simplicity, and should be understood flexibly to include not only the numerical values that are explicitly defined in the range, but also all the individual values or sub-ranges that are included in the range, as if each value and sub-range are explicitly specified.

In the specific embodiments and claims, a list of items connected by the term "one of" or a similar term may mean any of all the items listed. For example, if items A and B are listed, the phrase "one of A and B" means only A or only B. In another example, if items A, B, and C are listed, the phrase "one of A, B, and C" means only A, only B, or only C. The item A may include a single element or a plurality of elements. The item B may include a single element or a plurality of elements. The item C may include a single element or a plurality of elements.

In the specific embodiments and claims, a list of items connected by the term "at least one of" or a similar term may mean any combination of all the items listed. For example, if items A and B are listed, the phrase "at least one of A and B" means only A, only B, or A and B. In another example, if items A, B, and C are listed, the phrase "at least one of A, B, and C" means only A, only B, only C, A and B (excluding C), A and C (excluding B), or all of A, B, and C. The item A may include a single element or a plurality of elements. The item B may include a single element or a plurality of elements. The item C may include a single element or a plurality of elements.

As used herein, the "alkyl group" is intended to be a linear saturated hydrocarbon structure having 1 to 20 carbon atoms. The "alkyl group" is also intended to be a branched or cyclic hydrocarbon structure having 3 to 20 carbon atoms. For example, the alkyl group may be an alkyl group having 1 to 20 carbon atoms, an alkyl group having 1 to 10 carbon atoms, an alkyl group having 1 to 5 carbon atoms, an alkyl group having 5 to 20 carbon atoms, an alkyl group having 5 to 15 carbon atoms, or an alkyl group having 5 to 10 carbon atoms. When an alkyl group having a specific carbon number is defined, it is intended to cover all geometric isomers having the carbon number. Therefore, for example, "butyl" means n-butyl, sec-butyl, isobutyl, tert-butyl and cyclobutyl; and "propyl" includes n-propyl, isopropyl and cyclopropyl. Examples of the alkyl group include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornanyl and the like. In addition, the alkyl group can be optionally substituted.

As used herein, the term "alkylene group" means a linear or branched divalent saturated hydrocarbon group. For example, the alkylene group may be an alkylene group having 1 to 20 carbon atoms, an alkylene group having 1 to 15 carbon atoms, an alkylene group having 1 to 10 carbon atoms, an alkylene group having 1 to 5 carbon atoms, an alkylene group having 5 to 20 carbon atoms, an alkylene group having 5 to 15 carbon atoms, or alkylene group having 5 to 10 carbon atoms. Representative alkylene groups include (for example) methylene, ethane-1,2-diyl ("ethylene"), propane-1,2-diyl, propane-1,3-diyl, butane-1,4-diyl, pentane-1,5-diyl and the like. In addition, the alkylene group can be optionally substituted.

As used herein, the term "alkenylene group" encompasses both linear and branched alkenylene groups. When an alkenylene group having a specific carbon number is defined, it is intended to cover all geometric isomers having the carbon number. For example, the alkenylene group may be an alkenylene group having 2 to 20 carbon atoms, an alkenylene group having 2 to 15 carbon atoms, an alkenylene group having 2 to 10 carbon atoms, an alkenylene group having 2 to 5 carbon atoms, an alkenylene group having 5 to 20 carbon atoms, an alkenylene group having 5 to 15 carbon atoms, or an alkenylene group having 5 to 10 carbon atoms. Representative alkenylene groups include (for example) vinylyl, allylidene, butenylidene, and the like. In addition, the alkenylene group can be optionally substituted.

As used herein, the term "aryl group" encompasses both monocyclic and polycyclic systems. A polycyclic ring may have two or more rings in which two carbons are shared by two adjacent rings (where the rings are "fused"), where at least one of the rings is aromatic and other rings may be for example, a cycloalkyl group, a cycloalkenyl group, an aryl group, a heterocyclyl group and/or a heteroaryl group. For example, the aryl group may be a $C_6$-$C_{50}$ aryl group, a $C_6$-$C_{40}$ aryl group, a $C_6$-$C_{30}$ aryl group, a $C_6$-$C_{20}$ aryl group, or a $C_6$-$C_{10}$ aryl group. Representative aryl groups include (for example) phenyl, methylphenyl, propylphenyl, isopropylphenyl, benzyl and naphthalen-1-yl, naphthalen-2-yl and the like. In addition, the aryl group can be optionally substituted.

As used herein, the term "cyclohydrocarbon group" encompasses cyclic hydrocarbon groups. For example, the cyclohydrocarbon group may be a cyclohydrocarbon group having 3 to 20 carbon atoms, a cyclohydrocarbon group having 3 to 15 carbon atoms, a cyclohydrocarbon group having 3 to 10 carbon atoms, a cyclohydrocarbon group having 3 to 6 carbon atoms, a cyclohydrocarbon group having 5 to 20 carbon atoms, a cyclohydrocarbon group having 5 to 15 carbon atoms, or a cyclohydrocarbon group having 5 to 10 carbon atoms. In addition, the cyclohydrocarbon group can be optionally substituted. For example, the cyclohydrocarbon group may be substituted with a halogen including fluorine, chlorine, bromine, and iodine, an alkyl group, an aryl group or a heteroaryl group.

As used herein, the term "alkenyl group" refers to a monovalent unsaturated hydrocarbon group which may be straight or branched and which has at least one and usually 1, 2 or 3 carbon-carbon double bonds. Unless otherwise defined, the alkenyl group typically contains 2 to 20 carbon atoms, for example, an alkenyl group having 2 to 20 carbon atoms, an alkenyl group having 6 to 20 carbon atoms, an alkenyl group having 2 to 12 carbon atoms or an alkenyl group having 2 to 6 carbon atoms. Representative alkenyl groups include (for example) ethenyl, n-propenyl, iso-propenyl, n-but-2-enyl, butyl-3-enyl, n-hex-3-enyl, and the like. In addition, the alkenyl group can be optionally substituted.

As used herein, the term "halogen" encompasses F, Cl, Br or I.

When the foregoing substituent groups are substituted, substituent groups thereof may be independently selected from a group consisting of a halogen, an alkyl group, a cyclic hydrocarbon group, an alkenyl group, and an aryl group.

As used herein, the content of each component is calculated based on the total weight of the electrolytic solution.

I. Electrolytic Solution

An embodiment of this application provides an electrolytic solution, including an electrolyte and a solvent in which the electrolyte is dissolved. The electrolytic solution of this application includes a compound containing a —CN functional group and a compound containing a P—O bond, where the compound containing a —CN functional group includes a compound represented by formula I-A:

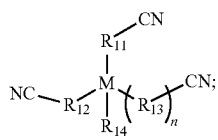
(I-A)

M is at least one selected from the group consisting of N, P, C, and Si;

$R_{11}$, $R_{12}$, and $R_{13}$ are independently selected from a substituted or non-substituted $C_1$-$C_{20}$ alkylene group, a substituted or non-substituted $C_1$-$C_{12}$ alkylene group, a substituted or non-substituted $C_1$-$C_6$ alkylene group, a substituted or non-substituted $C_2$-$C_2$ alkenylene group, a substituted or non-substituted $C_2$-$C_{12}$ alkenylene group, a substituted or non-substituted $C_2$-$C_6$ alkenylene group, an $R_0$—S—R group or an $R_0$—O—R group, $R_0$ and R being independently selected from a substituted or non-substituted $C_1$-$C_{12}$ alkylene group or a substituted or non-substituted $C_1$-$C_6$ alkylene group;

n is selected from 0 or 1;

$R_{14}$ is selected from H, fluorine, a cyano group, a substituted or non-substituted $C_1$-$C_{20}$ alkyl group, a substituted or non-substituted $C_1$-$C_{12}$ alkyl group, a substituted or non-substituted $C_1$-$C_6$ alkyl group, a substituted or non-substituted $C_2$-$C_{20}$ alkenyl group, a substituted or non-substituted $C_2$-$C_{12}$ alkenyl group, a substituted or non-substituted $C_2$-$C_6$ alkenyl group, an $R_0$—S—R group, or an $R_0$—O—R group, $R_0$ and R being independently selected from a substituted or non-substituted $C_1$-$C_{12}$ alkyl group, or a substituted or non-substituted $C_1$-$C_6$ alkyl group;

when being substituted, a substituent is selected from a halogen, a cyano group, a $C_1$-$C_6$ alkyl group, a $C_2$-$C_6$ alkenyl group, or any combination thereof; and when M is N or P, only three of $R_{11}$, $R_{12}$, $R_{13}$, and $R_{14}$ are present.

In some embodiments, the compound containing a P—O bond includes at least one of a compound represented by formula II-A or compounds represented by II-B:

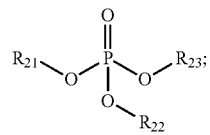
(II-A)

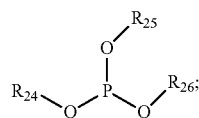
(II-B)

where $R_{21}$, $R_{22}$, $R_{23}$, $R_{24}$, $R_{25}$, and $R_{26}$ are each independently selected from $R^a$, Si—$(R'')_3$ or $R'$—Si—$(R'')_3$;

$R^a$ and $R''$ are each independently selected from a $C_1$-$C_{20}$ alkyl group, a $C_1$-$C_{12}$ alkyl group, a $C_1$-$C_6$ alkyl group, a $C_2$-$C_{20}$ alkenyl group, a $C_2$-$C_{12}$ alkenyl group, a $C_2$-$C_6$ alkenyl group, a $C_3$-$C_{20}$ cyclic hydrocarbon group, a $C_3$-$C_{10}$ cyclic hydrocarbon group, a $C_6$-$C_{10}$ cyclic hydrocarbon group, a $C_6$-$C_{50}$ aryl group, a $C_6$-$C_{26}$ aryl group or a $C_6$-$C_{12}$ aryl group;

R' is selected from a $C_1$-$C_{20}$ alkylene group, a $C_1$-$C_{12}$ alkylene group, a $C_1$-$C_6$ alkylene group, a $C_2$-$C_{20}$ alkenylene group, a $C_2$-$C_{12}$ alkenylene group, or a $C_2$-$C_6$ alkenylene group; and $R_{21}$, $R_{22}$, $R_{23}$, $R_{24}$, $R_{25}$, and $R_{26}$ are each independently substituted or non-substituted, and a substituent group for substitution is selected from a halogen, a $C_1$-$C_6$ alkyl group, a $C_2$-$C_6$ alkenyl group, or any combination thereof.

In some embodiments, at least one of $R_{21}$, $R_{22}$, $R_{23}$, $R_{24}$, $R_{25}$, and $R_{26}$ includes a Si atom.

In some embodiments, the compound containing a —CN functional group includes at least one of the following compounds:

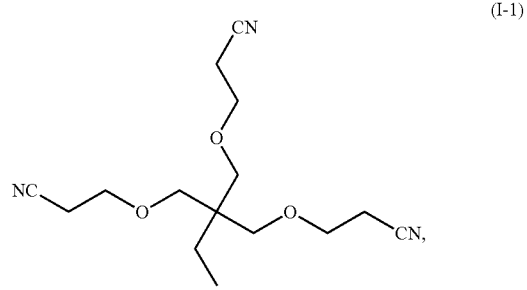
(I-1)

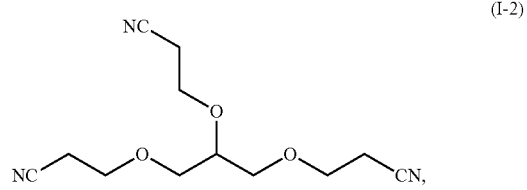
(I-2)

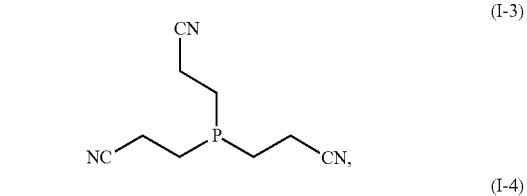
(I-3)

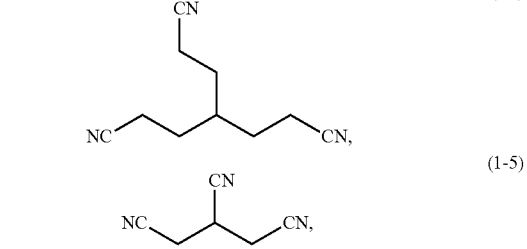
(I-4)

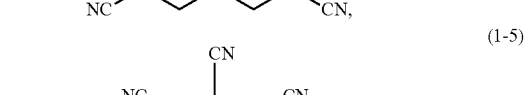
(I-5)

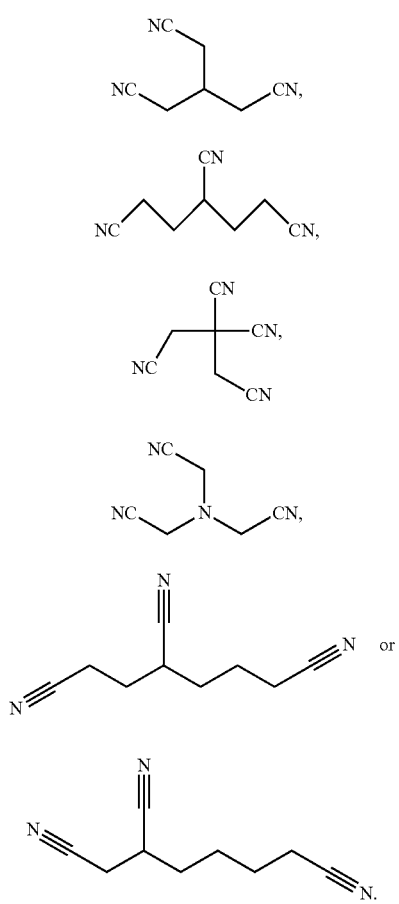

In some embodiments, the compound containing a P—O bond includes at least one of the following compounds:

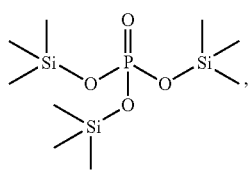

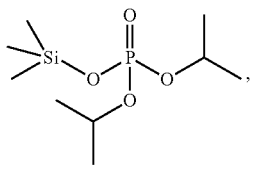

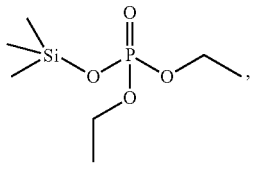

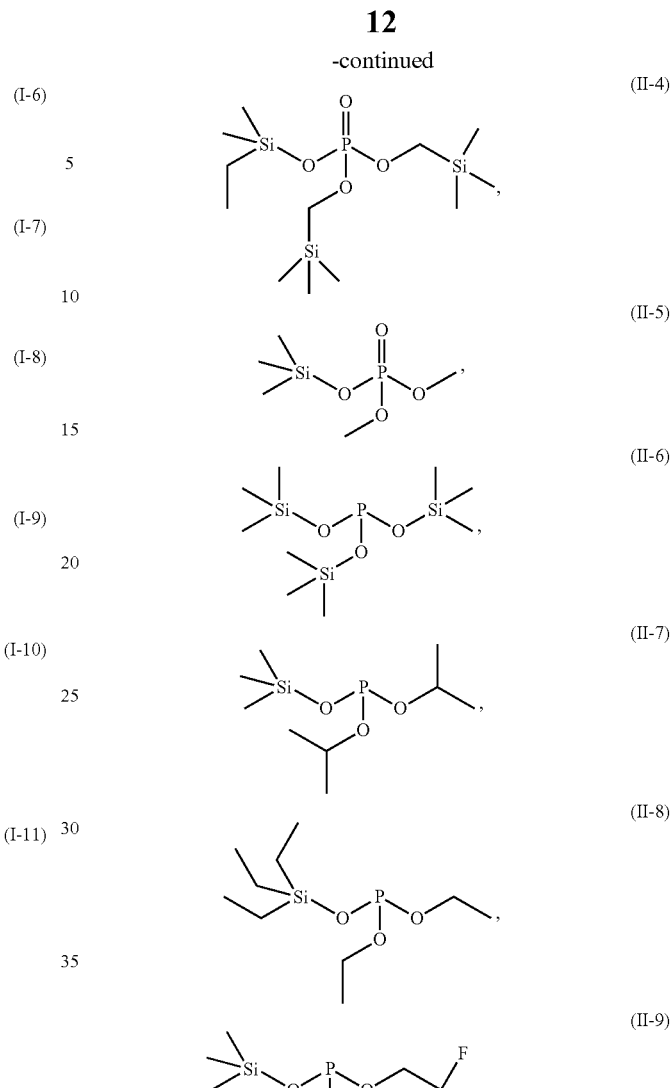

In some embodiments, based on the total weight of the electrolytic solution, the weight percentage of the compound containing a —CN functional group is about 0.01 wt % to about 10 wt %. In some embodiments, based on the total weight of the electrolytic solution, the weight percentage of the compound containing a —CN functional group is not greater than about 10 wt %, not greater than about 5 wt %, not greater than about 4 wt %, not greater than about 3 wt %, not greater than about 2.0 wt %, not greater than about 1.5 wt %, or not greater than about 1.0 wt %. In some embodiments, based on the total weight of the electrolytic solution, the weight percentage of the compound containing a —CN functional group is not less than about 0.1 wt %, not less than about 0.3 wt %, not less than about 0.5 wt %, or not less than about 0.6 wt %. In some embodiments, based on the total weight of the electrolytic solution, the weight percentage of the compound containing a —CN functional group is about 0.1 wt % to about 5 wt %.

In some embodiments, based on the total weight of the electrolytic solution, the weight percentage of the compound containing a P—O bond is about 0.01 wt % to about 5 wt %. In some embodiments, based on the total weight of the electrolytic solution, the weight percentage of the compound containing a P—O bond is not greater than about 5 wt %, not greater than about 2.0 wt %, not greater than about 1.5 wt %, or not greater than about 1 wt %. In some embodiments, based on the total weight of the electrolytic solution, the weight percentage of the compound containing a P—O bond is not less than about 0.01 wt %, not less than about 0.1 wt %, not less than about 0.3 wt %, not less than about 0.5 wt %, or not less than about 0.6 wt %.

In some embodiments, the electrolytic solution further includes a cyclic carbonate, and the cyclic carbonate includes a compound represented by formula III-A:

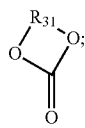

(III-A)

wherein $R_{31}$ is selected from a substituted or non-substituted $C_1$-$C_{20}$ alkylene group, a substituted or non-substituted $C_1$-$C_{12}$ alkylene group, a substituted or non-substituted $C_1$-$C_6$ alkylene group, a substituted or non-substituted $C_2$-$C_{20}$ alkenylene group, a substituted or non-substituted $C_2$-$C_{12}$ alkenylene group, or a substituted or non-substituted $C_2$-$C_6$ alkenylene group; and when being substituted, a substituent is selected from a halogen, a $C_1$-$C_6$ alkyl group, a $C_2$-$C_6$ alkenyl group or any combination thereof.

In some embodiments, the cyclic carbonate includes at least one of the following compounds: fluoroethylene carbonate, vinylene carbonate, or vinylethylene carbonate.

In some embodiments, the cyclic carbonate includes at least one of ethylene carbonate (EC), propylene carbonate (PC), and butylene carbonate.

In some embodiments, based on the total weight of the electrolytic solution, the weight percentage of the cyclic carbonate is about 0.01 wt % to about 50 wt %. In some embodiments, based on the total weight of the electrolytic solution, the weight percentage of the cyclic carbonate is about 0.01 wt % to about 30 wt %. In some embodiments, based on the total weight of the electrolytic solution, the weight percentage of the cyclic carbonate is about 0.01 wt % to about 10 wt %. In some embodiments, based on the total weight of the electrolytic solution, the weight percentage of the cyclic carbonate is about 5 wt % to about 30 wt %. In some embodiments, based on the total weight of the electrolytic solution, the weight percentage of the cyclic carbonate is about 5 wt % to about 20 wt %. In some embodiments, based on the total weight of the electrolytic solution, the weight percentage of the cyclic carbonate is about 0.01 wt %, about 0.05 wt %, about 0.1 wt %, about 1 wt %, about 5 wt %, about 10 wt %, about 20 wt %, about 30 wt %, about 40 wt %, or about 50 wt %.

The cyclic carbonate is combined with the compound containing a —CN functional group and the compound containing a P—O bond, so that the anode has excellent film-forming stability, interface protection of the anode can be enhanced, and the storage performance of an electrochemical device (such as a battery) under a low voltage can be improved.

In some embodiments, the electrolytic solution further includes a carbonate compound containing a silicon functional group, and the carbonate compound containing a silicon functional group includes a compound represented by formula IV-A:

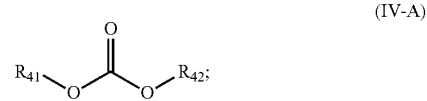

(IV-A)

wherein $R_{41}$ and $R_{42}$ are each independently selected from $R^a$, Si—$(R'')_3$ or R'—Si—$(R'')_3$, and at least one of $R_{41}$ and $R_{42}$ contains Si;

each of $R^a$ and $R''$ is each independently selected from a $C_1$-$C_{20}$ alkyl group, a $C_1$-$C_{12}$ alkyl group, a $C_1$-$C_6$ alkyl group, a $C_2$-$C_{20}$ alkenyl group, a $C_2$-$C_{12}$ alkenyl group, a $C_2$-$C_6$ alkenyl group, a $C_3$-$C_{20}$ cyclic hydrocarbon group, a $C_3$-$C_{10}$ cyclic hydrocarbon group, a $C_6$-$C_{10}$ cyclic hydrocarbon group, a $C_6$-$C_{50}$ aryl group, a $C_6$-$C_{26}$ aryl group or a $C_6$-$C_{12}$ aryl group;

R' is selected from a $C_1$-$C_{20}$ alkylene group, a $C_1$-$C_{12}$ alkylene group, a $C_1$-$C_6$ alkylene group, a $C_2$-$C_{20}$ alkenylene group, a $C_2$-$C_{12}$ alkenylene group, or a $C_2$-$C_6$ alkenylene group; and $R_{41}$ and $R_{42}$ are each independently substituted or non-substituted, and when being substituted, a substituent is selected from a halogen, a $C_1$-$C_6$ alkyl group, a $C_2$-$C_6$ alkenyl group or any combination thereof.

In some embodiments, the carbonate compound containing a silicon functional group includes at least one of the following compounds:

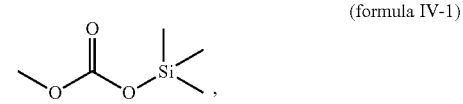

(formula IV-1)

(formula IV-2)

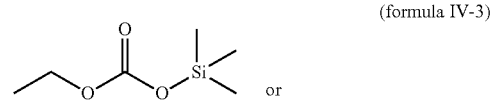

(formula IV-3)

or

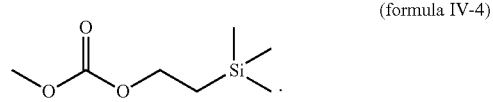

(formula IV-4)

In some embodiments, based on the total weight of the electrolytic solution, the weight percentage of the carbonate compound containing a silicon functional group is about 0.01 wt % to about 50 wt %. In some embodiments, based on the total weight of the electrolytic solution, the weight percentage of the carbonate compound containing a silicon functional group is about 5 wt % to about 30 wt %. In some embodiments, based on the total weight of the electrolytic solution, the weight percentage of the carbonate compound containing a silicon functional group is about 10 wt % to about 20 wt %. In some embodiments, based on the total weight of the electrolytic solution, the weight percentage of the carbonate compound containing a silicon functional group is about 5 wt % to about 20 wt %. In some embodiments, based on the total weight of the electrolytic solution, the weight percentage of the carbonate compound containing a silicon functional group is about 5 wt %, about 10 wt %, about 15 wt %, about 20 wt %, about 25 wt %, about 30 wt %, about 35 wt %, about 40 wt %, about 45 wt % or about 50 wt %.

The carbonate compound containing a silicon functional group is combined with the compound containing a —CN functional group and the compound containing a P—O bond, so that the electrolytic solution has low surface tension and excellent chemical stability, thermal stability, and oxidation resistance, and a layer of stable protective film can be formed on the surface of the electrode, thereby reducing heat produced by decomposition of the electrolytic solution on the surface of the electrode during charging an electrochemical device (such as a lithium ion battery), so as to improve the overcharge performance of the electrochemical device.

In some embodiments, the electrolytic solution further includes a carboxylate, and the carboxylate includes a compound represented by formula V-A:

where $R_{51}$ and $R_{52}$ are each independently selected from a substituted or non-substituted $C_1$-$C_{20}$ alkyl group, a substituted or non-substituted $C_1$-$C_{12}$ alkyl group, a substituted or non-substituted $C_1$-$C_6$ alkyl group, a substituted or non-substituted $C_2$-$C_{20}$ alkenyl group, a substituted or non-substituted $C_2$-$C_{12}$ alkenyl group, or a substituted or non-substituted $C_2$-$C_6$ alkenyl group; and when being substituted, a substituent is selected from a halogen, a $C_1$-$C_6$ alkyl group, a $C_2$-$C_6$ alkenyl group or any combination thereof.

In some embodiments, the carboxylate includes at least one of the following compounds: propylpropionate, trifluoroethylacetate, fluoroethylacetate, methylacetate, ethylacetate, propylacetate, isopropylacetate, butylacetate, sec-butylacetate, mephendioxan, tert-butylacetate, methylpropionate, ethylpropionate, isopropylpropionate, methylbutyrate, ethylbutyrate, propylbutyrate, isomethylbutyrate, isoethylbutyrate, methylvalerate, ethylvalerate, methylpivalate, and ethylvalerate.

In some embodiments, based on the total weight of the electrolytic solution, the content of the carboxylate is about 0.01 wt % to about 60 wt %. In some embodiments, based on the total weight of the electrolytic solution, the content of the carboxylate is about 5 wt % to about 40 wt %. In some embodiments, based on the total weight of the electrolytic solution, the content of the carboxylate is about 5 wt % to about 30 wt %. In some embodiments, based on the total weight of the electrolytic solution, the content of the carboxylate is about 5 wt % to about 20 wt %. In some embodiments, based on the total weight of the electrolytic solution, the content of the carboxylate is about 0.01 wt %, about 0.1 wt %, about 1 wt %, about 5 wt %, about 10 wt %, about 20 wt %, about 30 wt %, about 40 wt %, about 50 wt % or about 60 wt %.

Taking a lithium ion battery as an example, the carboxylate can improve the transmission capability of lithium ions in the electrolyte.

In some embodiments, the electrolyte further includes a lithium salt additive, and the lithium salt additive is selected from at least one of the following lithium salts: Lithium bis(trifluoromethanesulphonyl)imide $LiN(CF_3SO_2)_2$, lithium bis(fluorosulfonyl)imide (LiTFSI for short), Li(N(SO_2F)_2) (LiFSI for short), lithium bis(oxalate)borate LiB$(C_2O_4)_2$ (LiBOB for short), lithium tetrafluorophosphate xalate $LiPF_4C_2O_2$, lithium difluoro(oxalate)borate $LiBF_2(C_2O_4)$ (LiDFOB for short), and lithium difluorophosphate ($LiPO_2F_2$).

In some embodiments, based on the total weight of the electrolytic solution, the weight percentage of the lithium salt additive is about 0.01 wt % to about 18 wt %. In some embodiments, based on the total weight of the electrolytic solution, the weight percentage of the lithium salt additive is about 0.1 wt % to about 15 wt %. In some embodiments, based on the total weight of the electrolytic solution, the weight percentage of the lithium salt additive is about 0.01 wt %, about 0.1 wt %, about 0.5 wt %, about 1 wt %, about 2 wt %, about 5 wt % or about 10 wt %.

In some embodiments, the lithium salt additive and lithium hexafluorophosphate are used in combination with the compound containing a —CN functional group and the compound containing a P—O bond, so that the stability of lithium hexafluorophosphate can be enhanced; moreover, the lithium salt additive can also participate in and form a functional organic composite film, to reduce side reactions between the active material and the electrolytic solution, thereby improving the cycle performance of the battery.

In some embodiments, the electrolytic solution further includes a cesium salt additive, and the cesium salt additive includes cesium hexafluorophosphate ($CsPF_6$ for short).

In some embodiments, based on the total weight of the electrolytic solution, the weight percentage of the cesium salt additive is about 0.01 wt % to about 18 wt %. In some embodiments, based on the total weight of the electrolytic solution, the weight percentage of the cesium salt additive is about 0.1 wt % to about 15 wt %. In some embodiments, based on the total weight of the electrolytic solution, the weight percentage of the cesium salt additive is about 0.01 wt %, about 0.1 wt %, about 0.5 wt %, about 1 wt %, about 2 wt %, about 5 wt %, or about 10 wt %.

In some embodiments, the electrolytic solution further includes a dinitrile compound. The dinitrile compound has small steric hindrance, and therefore can overcome film-forming defects of multi-nitrile substances, thereby enhancing the interface protection for the cathode material.

In some embodiments, the dinitrile compound includes, but is not limited to, butanedinitrile, pentanedinitrile, hexanedinitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylbutanedinitrile, 2-methylpentanedinitrile, 2,4-dimethylpentanedinitrile, 2,2,4,4-tetramethylpentanedinitrile, 1,4-dicyanopentane, 1,4-dicyanopentane, 2,5-dimethyl-2,5-hexanedicarbonitrile, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,5-dioxa-pimelodinitrile, 1,4-bis(cyanoethoxy)butane, ethyleneglycoldi(2-cyanoethyl)ether, diethyleneglycoldi(2-cyanoethyl)ether, triethyleneglycoldi(2-cyanoethyl)ether, tetraethyleneglycoldi (2-cyanoethyl)ether, 3,6,9,12,15,18-hexaoxaeicosanoicdinitrile, 1,3-bis(2-cyanoethoxy)propane, 1,4-bis(2-cyanoethoxy)butane, 1,5-bis(2-cyanoethoxy)pentane and ethyleneglycoldi(4-cyanobutyl)ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, and 1,6-dicyano-2-methyl-5-methyl-3-hexene.

In some embodiments, based on the total weight of the electrolytic solution, the weight percentage of the dinitrile compound is about 0.1 wt % to about 15 wt %. In some embodiments, based on the total weight of the electrolytic solution, the weight percentage of the dinitrile compound is not less than about 0.1 wt %. In some embodiments, based on the total weight of the electrolytic solution, the weight percentage of the dinitrile compound is not less than about 0.5 wt %. In some embodiments, based on the total weight of the electrolytic solution, the weight percentage of the dinitrile compound is not less than about 2 wt %. In some embodiments, based on the total weight of the electrolytic solution, the weight percentage of the dinitrile compound is not less than about 4 wt %. In some embodiments, based on the total weight of the electrolytic solution, the weight percentage of the dinitrile compound is not greater than about 15 wt %. In some embodiments, based on the total weight of the electrolytic solution, the weight percentage of the dinitrile compound is not greater than about 10 wt %. In some embodiments, based on the total weight of the electrolytic solution, the weight percentage of the dinitrile compound is not greater than about 8 wt %.

In some embodiments, the electrolytic solution further includes a cyclic ether. The cyclic ether can form films on the cathodes and anodes at the same time, thereby reducing reactions between the electrolytic solution and the active material.

In some embodiments, the cyclic ether includes, but is not limited to, tetrahydrofuran, 2-methyltetrahydrofuran, 1,3-dioxolan, 2-methyl 1,3-dioxolan, 4-methyl-1,3-dioxolan, 1,3-dioxane, 1,4-dioxane, and dimethoxypropane.

In some embodiments, based on the total weight of the electrolytic solution, the weight percentage of the cyclic ether is about 0.1 wt % to 10 wt %. In some embodiments, based on the total weight of the electrolytic solution, the weight percentage of the cyclic ether is not less than about 0.1 wt %. In some embodiments, based on the total weight of the electrolytic solution, the weight percentage of the cyclic ether is not less than about 0.5 wt %. In some embodiments, based on the total weight of the electrolytic solution, the weight percentage of the cyclic ether is not greater than about 2 wt %. In some embodiments, based on the total weight of the electrolytic solution, the weight percentage of the cyclic ether is not greater than about 5 wt %.

In some embodiments, the electrolytic solution further includes a chain ether. In some embodiments, the chain ether includes, but is not limited to, dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, and 1,2-ethoxymethoxyethane.

In some embodiments, based on the total weight of the electrolytic solution, the weight percentage of the chain ether is about 0.1 wt % to 10 wt %. In some embodiments, based on the total weight of the electrolytic solution, the weight percentage of the chain ether is not less than about 0.5 wt %. In some embodiments, based on the total weight of the electrolytic solution, the weight percentage of the chain ether is not less than about 2 wt %. In some embodiments, based on the total weight of the electrolytic solution, the weight percentage of the chain ether is not less than about 3 wt %. In some embodiments, based on the total weight of the electrolytic solution, the weight percentage of the chain ether is not greater than about 10 wt %. In some embodiments, based on the total weight of the electrolytic solution, the weight percentage of the chain ether is not greater than about 5 wt %.

In some embodiments, the electrolytic solution further includes a phosphorus-containing organic solvent. The phosphorus-containing organic solvent can enhance the safety performance of the electrolytic solution. In some embodiments, the phosphorus-containing organic solvent includes, but is not limited to, trimethylphosphate, triethylphosphate, dimethylethylphosphate, methyldiethylphosphate, ethylidenemethylphosphate, ethylideneethylphosphate, triphenylphosphate, trimethylphosphite, triethylphosphite, triphenylphosphite, tri(2,2,2-trifluoroethyl)phosphate, and tri(2,2,3,3,3-pentafluoropropyl)phosphate.

In some embodiments, based on the total weight of the electrolytic solution, the weight percentage of the phosphorus-containing organic solvent is about 0.1 wt % to 10 wt %. In some embodiments, based on the total weight of the electrolytic solution, the weight percentage of the phosphorus-containing organic solvent is not less than about 0.1 wt %. In some embodiments, based on the total weight of the electrolytic solution, the weight percentage of the phosphorus-containing organic solvent is not less than about 0.5 wt %. In some embodiments, based on the total weight of the electrolytic solution, the weight percentage of the phosphorus-containing organic solvent is not greater than about 2 wt %. In some embodiments, based on the total weight of the electrolytic solution, the weight percentage of the phosphorus-containing organic solvent is not greater than about 3 wt %. In some embodiments, based on the total weight of the electrolyte, the weight percentage of the phosphorus-containing organic solvent is not greater than about 5 wt %.

In some embodiments, the electrolytic solution further includes an aromatic fluorine-containing solvent. The aromatic fluorine-containing solvent can form a film rapidly so as to protect the active material, and the fluorine-containing substance can improve the infiltration performance of the electrolytic solution for the active material. In some embodiments, the aromatic fluorine-containing solvent includes, but is not limited to, fluorobenzene, difluorobenzene, trifluorobenzene, tetrafluorobenzene, pentafluorobenzene, hexafluorobenzene, trifluoromethylbenzene.

In some embodiments, based on the total weight of the electrolytic solution, the weight percentage of the aromatic fluorine-containing solvent is about 0.1 wt % to 10 wt %. In some embodiments, based on the total weight of the electrolytic solution, the weight percentage of the aromatic fluorine-containing solvent is not less than about 0.5 wt %. In some embodiments, based on the total weight of the electrolytic solution, the weight percentage of the aromatic fluorine-containing solvent is not less than about 2 wt %. In some embodiments, based on the total weight of the electrolytic solution, the weight percentage of the aromatic fluorine-containing solvent is not greater than about 4 wt %. In some embodiments, based on the total weight of the electrolytic solution, the weight percentage of the aromatic fluorine-containing solvent is not greater than about 8 wt %.

II. Electrolyte

An electrolyte used in the electrolytic solution in the embodiments of the present application may be an electrolyte known in the prior art, wherein the electrolyte includes, but is not limited to, an inorganic lithium salt, such as $LiCO_4$, $LiAsF_6$, $LiPF_6$, $LiBF_4$, $LiSbF_6$, $LiSO_3F$, $LiN(FSO_2)_2$, and the like; a fluorine-containing organic lithium salt, such as $LiCF_3SO_3$, $LiN(FSO_2)(CF_3SO_2)$, $LiN(CF_3SO_2)_2$, $LiN(C_2F_5SO_2)_2$, lithium cyclic 1,3-hexafluoropropanedisulfonimide, lithium cyclic 1,2-tetrafluoroethane-disulfonimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$; a lithium salt containing a dicarboxylic complex, such as lithium bis(oxalato)borate, lithium difluorooxalatoborate, lithium tri(oxalato)phosphate, lithium difluorobis(oxalato)phosphate, and lithium tetrafluoro(oxalato)phosphate. In addition, the foregoing electrolyte may use one of the aforementioned substances, or use two or more of the aforementioned substances. For example, in some embodiments, the electrolyte includes a combination of $LiPF_6$ and $LiBF_4$. In some embodiments, the electrolyte includes a combination of an inorganic lithium salt, such as $LiPF_6$ or $LiBF_4$, and a fluorine-containing organic lithium salt such as $LiCF_3SO_3$, $LiN(CF_3SO_2)_2$, or $LiN(C_2F_5SO_2)_2$. In some embodiments, the concentration of the electrolyte is in a range from about 0.8 to about 3 mol/L, for example, in a range from about 0.8 to about 2.5 mol/L, in a range from about 0.8 to about 2 mol/L, in a range from about 1 to about 2 mol/L, from about 0.5 to about 1.5 mol/L, from about 0.8 to about 1.3 mol/L, or from about 0.5 to about 1.2 mol/L, and for another example, about 1 mol/L, about 1.15 mol/L, about 1.2 mol/L, about 1.5 mol/L, about 2 mol/L, or about 2.5 mol/L.

III. Electrochemical Device

The electrochemical device of the present application includes any device in which an electrochemical reaction occurs. Specific examples of the electrochemical device include all types of primary batteries, secondary batteries, fuel batteries, solar batteries or capacitors. In particular, the electrochemical device is lithium secondary battery, including a lithium metal secondary battery, a lithium ion secondary battery, a lithium polymer secondary battery, or a lithium ion polymer secondary battery. In some embodiments, the electrochemical device is an electrochemical device with a cathode having a cathode active material capable of absorbing and releasing metal ions and an anode having a negative active material capable of absorbing and releasing metal ions, and includes any of the foregoing electrolytic solutions in this application.

1. Electrolytic Solution

The electrolytic solution used in the electrochemical device of the present application is any of the foregoing electrolytic solutions in the present application. In addition, the electrolytic solution used in the electrochemical device of the present application may further include other electrolytic solutions without departing from the scope of the subject of this application.

2. Anode

The anode material used in the electrochemical device of the present application, and the construction and manufacturing method thereof are not particularly limited, and may be any of the techniques disclosed in the prior art. In some embodiments, the anode may be the one described in U.S. Pat. No. 9,812,739B, which is incorporated herein by reference in its entirety.

In some embodiments, the anode includes a current collector and a negative active material layer located on the current collector. The anode active material includes a material that reversibly intercalates and de-intercalates lithium ions. In some embodiments, the material that reversibly intercalates and de-intercalates lithium ions includes a carbon material. In some embodiments, the carbon material may be any carbon-based negative active material generally used in a lithium ion rechargeable battery. In some embodiments, the carbon material includes, but is not limited to, crystalline carbon, non-crystalline carbon, or a mixture thereof. The crystalline carbon may be amorphous, flake-like, strip-like, spherical, or fibrous natural graphite or artificial graphite. The non-crystalline carbon may be soft carbon, hard carbon, mesophase pitch carbide, calcined coke, and the like.

In some embodiments, the anode active material layer includes an anode active material. In some embodiments, the anode active material includes, but is not limited to, lithium metal, structured lithium metal, natural graphite, artificial graphite, mesocarbon microbeads (MCMB), hard carbon, soft carbon, silicon, a silicon-carbon complex, a Li—Sn alloy, a Li—Sn—O alloy, Sn, SnO, $SnO_2$, lithiated $TiO_2$—$Li_4Ti_5O_2$ with a spinel structure, a Li—Al alloy, or any combination thereof.

When the anode includes a silicon carbide, based on the total weight of the anode active material, a ratio of silicon to carbon is about 1:10 to about 10:1, and a median diameter Dv50 of the silicon carbide compound is about 0.1 um to about 100 um. When the anode includes an alloy material, the anode active material layer can be formed by means of evaporation, sputtering, plating, and the like. When the anode includes lithium metal, for example, the anode active material layer is formed by using a spherical twisted conductive skeleton and metal particles dispersed in the conductive skeleton. In some embodiments, the spherical twisted conductive skeleton may have a porosity of about 5% to about 85%. In some embodiments, a protective layer may further be disposed on the anode active material layer made of lithium metal.

In some embodiments, the anode active material layer may include a binder, and optionally a conductive material. The binder increases the binding of the anode active material particles to each other and the binding of the anode active material to the current collector. In some embodiments, the binder includes, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidenefluoride), polyethylene, polypropylene, styrene butadiene rubber, acrylated styrene butadiene rubber, epoxy resins, Nylon and the like.

In some embodiments, the conductive material includes, but is not limited to, a carbon-based material, a metal-based material, a conductive polymer, or a mixture thereof. In some embodiments, the carbon-based material is selected from natural graphite, artificial graphite, carbon black, acetylene black, Ketjen black, carbon fiber, or any combination thereof. In some embodiments, the metal-based material is selected from metal powders, metal fibers, copper, nickel, aluminum, and silver. In some embodiments, the conductive polymer is a polyphenylene derivative.

In some embodiments, the current collector includes, but is not limited to, copper foil, nickel foil, stainless steel foil, titanium foil, foamed nickel, foamed copper, polymeric substrates coated with a conductive metal, and any combination thereof.

The anode can be prepared by using a preparation method well known in the art. For example, the anode may be obtained by mixing an active material, a conductive material and a binder in a solvent to prepare an active material composition, and coating the active material composition on a current collector. In some embodiments, the solvent may include, but is not limited to, water.

3. Cathode

The cathode material used in the electrochemical device of this application can be prepared by using materials, construction and manufacturing methods well known in the art. In some embodiments, the cathode of this application can be prepared using the technique described in U.S. Pat. No. 9,812,739B, which is incorporated herein by reference in its entirety.

In some embodiments, the cathode includes a current collector and a cathode active material layer on the current collector. The cathode active material includes at least one lithiated intercalation compound that reversibly intercalates and de-intercalates lithium ions. In some embodiments, the cathode active material includes a composite oxide. In some embodiments, the composite oxide contains lithium and at least one element selected from the group consisting of cobalt, manganese, and nickel.

In some embodiments, the cathode active material is selected from lithium cobaltate ($LiCoO_2$), lithium nickel cobalt manganese (NCM) ternary material, lithium iron phosphate ($LiFePO_4$), lithium manganate ($LiMn_2O_4$) or any combination thereof.

In some embodiments, the cathode active material may have a coating on its surface or may be mixed with another compound having a coating. The coating may include at least one coating element compound selected from the group consisting of an oxide of a coating element, a hydroxide of a coating element, an oxyhydroxide of a coating element, an oxycarbonate of a coating element, and a hydroxycarbonate of a coating element. The compound used for the coating may be amorphous or crystalline.

In some embodiments, the coating element contained in the coating may include Mg, Al, Co, K, Na, Ca, Si, Ti, V, Sn, Ge, Ga, B, As, Zr, F or any combination thereof. The coating may be applied by using any method as long as the method does not adversely affect the performance of the cathode active material. For example, the method may include any coating method known in the art, such as spraying, dipping, and the like.

The cathode active material layer further includes a binder, and optionally a conductive material. The binder increases the binding of the cathode active material particles to each other and the binding of the cathode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidenefluoride), polyethylene, polypropylene, styrene butadiene rubber, acrylated styrene butadiene rubber, epoxy resins, Nylon and the like.

In some embodiments, the conductive material includes, but is not limited to, a carbon-based material, a metal-based material, a conductive polymer, and a mixture thereof. In some embodiments, the carbon-based material is selected from natural graphite, artificial graphite, carbon black, acetylene black, Ketjen black, carbon fiber, or any combination thereof. In some embodiments, the metal-based material is selected from metal powders, metal fibers, copper, nickel, aluminum, and silver. In some embodiments, the conductive polymer is a polyphenylene derivative.

In some embodiments, the current collector may be, but is not limited to, aluminum.

The cathode can be prepared by using a preparation method well known in the art. For example, the cathode can be obtained by mixing an active material, a conductive material and a binder in a solvent to prepare an active material composition, and coating the active material composition on a current collector. In some embodiments, the solvent may include, but is not limited to, N-methylpyrrolidone or the like.

In some embodiments, the cathode is prepared by forming a cathode material with a cathode active material layer including a lithium-transition metal compound powder and a binder on a current collector.

In some embodiments, the cathode active material layer can generally be produced by dry mixing a cathode material and a binder (and a conductive material and a thickener if needed) to form flakes, and pressing the obtained flakes on a cathode current collector; or dissolving or dispersing the material in a liquid medium to form a slurry, coating the slurry on a cathode current collector, and drying. In some embodiments, the material of the cathode active material layer includes any material known in the art.

4. Separator

In some embodiments, the electrochemical device of this application is provided with a separator between the cathode and the anode to prevent short circuit. The material and shape of the separator used in the electrochemical device of this application are not particularly limited, and may be any of the techniques disclosed in the prior art. In some embodiments, the separator includes a polymer or an inorganic substance or the like formed of a material which is stable against the electrolytic solution of this application.

For example, the separator may include a substrate layer and a surface treatment layer. The substrate layer is a nonwoven fabric, film, or composite film having a porous structure, and the material of the substrate layer is at least one selected from the group consisting of polyethylene, polypropylene, polyethylene terephthalate, and polyimide. Particularly, a porous polypropylene film, a porous polyethylene film, a polypropylene nonwoven fabric, a polyethylene nonwoven fabric, or a porous polypropylene-polyethylene-polypropylene composite film may be used.

At least one surface of the substrate layer is provided with a surface treatment layer, which may be a polymer layer or an inorganic layer, or a layer formed by mixing a polymer and an inorganic material.

The inorganic layer includes inorganic particles and a binder. The inorganic particles are at least one selected from the group consisting of alumina, silica, magnesia, titania, hafnium dioxide, tin oxide, cerium dioxide, nickel oxide, zinc oxide, calcium oxide, zirconia, yttria, silicon carbide, eboehmite, aluminum hydroxide, magnesium hydroxide, calcium hydroxide and barium sulfate, or a combination of more than one thereof. The binder is one selected from the group consisting of polyvinylidene fluoride, a copolymer of vinylidene fluoride-hexafluoropropylene, polyamide, polyacrylonitrile, polyacrylate ester, polyacrylic acid, a polyacrylate salt, polyvinylpyrrolidone, polyvinyl ether, polymethyl methacrylate, polytetrafluoroethylene, and polyhexafluoropropylene, or a combination of more than one thereof. The polymer layer contains a polymer, and the material of the polymer includes at least one of polyamide, polyacrylonitrile, polyacrylate ester, polyacrylic acid, a polyacrylate salt, polyvinylpyrrolidone, polyvinyl ether, polyvinylidene fluoride or poly(vinylidene fluoride-hexafluoropropylene).

IV. Application

The electrolytic solution according to the embodiments of this application can be used for improving the rate performance, a normal-temperature storage capacity retention rate, as well as cyclic storage and high-temperature storage performance of the battery, and is suitable for use in electronic equipment containing the electrochemical device.

The use of the electrochemical device of this application is not particularly limited, and the electrochemical device can be used in various known applications, such as notebook computers, pen-input computers, mobile computers, e-book players, portable phones, portable fax machines, portable copiers, portable printers, head-mounted stereo headphones, video recorders, LCD TVs, portable cleaners, portable CD players, mini disc players, transceivers, electronic notebooks, calculators, memory cards, portable recorders, radios, backup power sources, motors, vehicles, motorcycles, scooters, bicycles, lighting apparatus, toys, game consoles, clocks, electric tools, flashlights, cameras, large batteries for household use, or lithium ion capacitors.

The preparation and performance of the lithium ion battery of this application are illustrated in the following by using a lithium ion battery as an example in combination with the specific embodiments for preparing the electrolytic solution of this application and test methods for the electrochemical device. A person skilled in the art will understand that, the preparation methods described in this application are merely an example, and all other suitable preparation methods fall within the scope of this application.

Although a lithium ion battery is used as an example for the description, a person skilled in the art can conceive that the cathode material of this application can be used for other suitable electrochemical devices. Such electrochemical devices include any devices in which electrochemical reactions occur. Specific examples of such electrochemical devices include all types of primary batteries, secondary batteries, fuel batteries, solar batteries or capacitors. In particular, the electrochemical device is a lithium secondary battery, including a lithium metal secondary battery, a lithium ion secondary battery, a lithium polymer secondary battery, or a lithium ion polymer secondary battery.

EXAMPLES

Hereinafter, this application will be specifically described by way of examples and comparative examples; however, this application is not limited to these examples as long as they do not deviate from the subject of this application.

1. Preparation of a Lithium Ion Battery

1) Preparation of an electrolytic solution: In an argon atmosphere glove box with a water content less than 10 ppm, ethylene carbonate (EC), diethyl carbonate (DEC), and propylene carbonate (PC) were evenly mixed according to a weight ratio of about 3:4:3, and then a sufficiently dried lithium salt $LiPF_6$ was dissolved in the solvent to obtain a basic electrolytic solution, where the concentration of $LiPF_6$ in the basic electrolytic solution was about 1 mol/L. Substances with different contents shown in the following tables were added to the basic electrolytic solution to obtain electrolytic solutions in different examples and comparative examples. The contents of all the substances in the electrolytic solution described below were calculated based on the total weight of the electrolytic solution.

2) Preparation of a cathode: The cathode active material lithium cobalt oxide ($LiCoO_2$), the conductive agent acetylene black, and the binder polydifluoroethylene (PVDF) were fully stirred and mixed in an appropriate amount of N-methylpyrrolidone (NMP) solvent according to a weight ratio of about 96:2:2, to form a uniform cathode slurry. The slurry was coated on a current collector Al foil of the cathode, dried, and cold-pressed to obtain a positive pole piece.

3) Preparation of an anode: The anode active material graphite, the conductive agent acetylene black, the binder styrene butadiene rubber (SBR), and the thickener sodium carboxymethylcellulose (CMC) were fully stirred and mixed in an appropriate amount of deionized water solvent according to a weight ratio of about 95:2:2:1, to form a uniform anode slurry. The slurry was coated on a current collector Cu foil of the anode, dried, and cold-pressed to obtain a negative pole piece.

4) Separator: A porous PE polymer film was used as a separator.

5) Preparation of a lithium ion battery: The cathode, the separator, and the anode were stacked in sequence, so that the separator was located between the cathode and the anode to act as the insulation, then wound and placed in packaging foil, with a liquid injection port remained. The electrolytic solution was poured into the liquid injection port, and a lithium ion battery was produced after processes such as vacuum packaging, standing, formation, and shaping.

The compounds containing a —CN functional group used in the examples are shown as follows:

(I-1)

(I-2)

(I-7)

The compounds containing a P—O bond used in the examples are shown as follows:

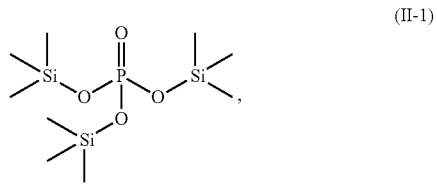
(II-1)

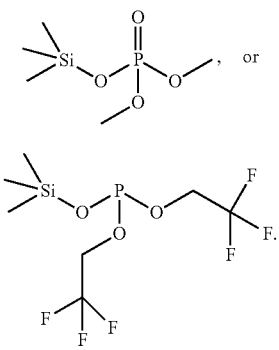

(II-5), or (II-9)

The specific cyclic carbonate used in the examples was fluoroethylene carbonate (FEC) or vinylethylene carbonate (VEC).

The silicon-containing carbonate used in the examples is shown as follows:

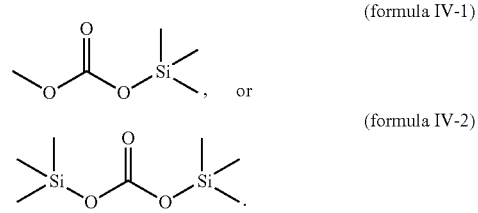

(formula IV-1), or (formula IV-2)

The specific carboxylate used in the examples was propylpropionate (PP) or trifluoroethylacetate (TFEA).

The specific lithium salt additive used in the examples was lithium tetrafluorophosphateoxalate ($LiPF_4C_2O_2$).

The specific cesium salt additive used in the examples was cesium hexafluorophosphate ($CsPF_6$).

A. The electrolytic solutions and lithium ion batteries in Examples 1-18 and Comparative Examples 1-4 were prepared according to the foregoing preparation method, wherein the contents of substances in the electrolytic solutions are shown in Table 1.

TABLE 1

| | Compound containing a —CN functional group (wt %) | | | Compound containing a P—O bond (wt %) | | |
|---|---|---|---|---|---|---|
| No. | I-1 | I-2 | I-7 | II-1 | II-5 | 11-9 |
| Example 1 | — | 0.1 | — | — | 1 | — |
| Example 2 | — | 0.3 | — | — | 1 | — |
| Example 3 | — | 0.5 | — | — | 1 | — |
| Example 4 | — | 1 | — | — | 1 | — |
| Example 5 | — | 1.5 | — | — | 1 | — |
| Example 6 | — | 2 | — | — | 1 | — |
| Example 7 | — | 5 | — | — | 1 | — |
| Example 8 | — | 10 | — | — | 1 | — |
| Example 9 | — | 2 | — | — | 0.1 | — |
| Example 10 | — | 2 | — | — | 0.5 | — |
| Example 11 | — | 2 | — | — | 0.6 | — |
| Example 12 | — | 2 | — | — | 1.5 | — |
| Example 13 | — | 2 | — | — | 2 | — |
| Example 14 | — | 2 | — | — | 4 | — |
| Example 15 | — | — | 2 | — | 0.6 | — |
| Example 16 | — | — | 2 | — | — | 0.6 |
| Example 17 | 2 | — | — | — | 0.6 | — |
| Example 18 | 2 | — | — | 0.6 | — | — |

TABLE 1-continued

| | Compound containing a —CN functional group (wt %) | | | Compound containing a P—O bond (wt %) | | |
|---|---|---|---|---|---|---|
| No. | I-1 | I-2 | I-7 | II-1 | II-5 | 11-9 |
| Comparative Example 1 | — | — | — | — | — | — |
| Comparative Example 2 | — | 15 | — | — | 0.6 | — |
| Comparative Example 3 | — | — | — | — | 0.6 | — |
| Comparative Example 4 | — | 15 | — | — | 7 | — |

"—" represents substance not present.

The performance of the lithium ion batteries in Examples 1-18 and Comparative Examples 1-4 was tested according to the following test methods.

1. Floatation Performance Test:

The battery was discharged to 3.0 V at 0.5 C at a temperature of 25° C., and then charged to 4.4 at 0.5 C. The battery was charged to 0.05 C at the constant voltage of 4.4 V. The thickness of the battery at this time was recorded. The thickness of the battery at this time was used as a reference, which was marked as $a_1$. Then, the battery was placed into an oven at 45° C. and allowed to stand for 50 days at the constant voltage of 4.4 V. A change in the thickness was monitored and marked as $b_1$. A formula for calculating the floatation thickness swelling rate is as follows: thickness percentage=$(b_1/a_1-1)*10000$. The thickness of the battery was measured by using a PPG soft pack battery thickness gauge, and the measurement was carried out at a pressure of 300 g. Test results after 50 days are shown in Table 2.

TABLE 2

| No. | 45° C.-4.4 V 50 days floatation thickness swelling rate | No. | 45° C.-4.4 V 50 D floatation thickness swelling rate |
|---|---|---|---|
| Example 1 | 8.54% | Example 12 | 6.25% |
| Example 2 | 7.80% | Example 13 | 6.27% |
| Example 3 | 7.00% | Example 14 | 6.30% |
| Example 4 | 6.60% | Example 15 | 6.23% |
| Example 5 | 6.30% | Example 16 | 6.22% |
| Example 6 | 6.20% | Example 17 | 6.21% |
| Example 7 | 6.21% | Example 18 | 6.22% |
| Example 8 | 6.20% | Comparative Example 1 | 20.50% |
| Example 9 | 6.21% | Comparative Example 2 | 9.30% |
| Example 10 | 6.22% | Comparative Example 3 | 18.10% |
| Example 11 | 6.23% | Comparative Example 4 | 11.20% |

It can be seen from the test results of Examples 1-14, Comparative Example 1, and Comparative Example 3 that, the addition of the compound containing a —CN functional group and the compound containing a P—O bond can improve the floatation performance of the battery, because, on one hand, the combination of them can protect the surface of the active material better, and on the other hand, the stability of the electrolytic solution can improve, thereby reducing side reactions.

2. Nailing Test:

The battery was charged to 4.4 V at a constant current of 0.5 C at a temperature of 25° C. and then charged at the constant voltage of 4.4 V until the current reached 0.05 C; the voltage was kept in a full-state at the voltage of 4.4 V. The temperature was 25±5° C., the diameter of the nail was 4 mm, a nailing speed was 30 mm/s, and the nail was retained for 300 s. The battery passed the test if it did not burn or explode. The results of the nailing test are shown in Table 3.

TABLE 3

| No. | 4.4 V-Nail |
|---|---|
| Example 1 | 3/5pass |
| Example 2 | 4/5pass |
| Example 3 | 4/5pass |
| Example 4 | 5/5pass |
| Example 5 | 5/5pass |
| Example 6 | 5/5pass |
| Example 7 | 5/5pass |
| Example 8 | 5/5pass |
| Example 9 | 5/5pass |
| Example 10 | 5/5pass |
| Example 11 | 5/5pass |
| Example 12 | 5/5pass |
| Example 13 | 5/5pass |
| Example 14 | 5/5pass |
| Example 15 | 5/5pass |
| Example 16 | 5/5pass |
| Example 17 | 5/5pass |
| Example 18 | 5/5pass |
| Comparative Example 1 | 0/5pass |
| Comparative Example 2 | 2/5pass |
| Comparative Example 3 | 1/5pass |
| Comparative Example 4 | 2/5pass |

It can be seen from the test results of Examples 1-14, Comparative Example 1, and Comparative Example 3 that, the addition of the compound containing a —CN functional group and the compound containing a P—O bond can enhance the protection of the active material, thereby improving the safety performance of the battery.

3. Cycle Impedance Test

The battery was charged to 4.4 V at 0.7 C at a temperature of 25° C. and then charged to 0.05 C at the constant voltage of 4.4 V. An impedance value of the battery in this state was monitored and recorded by using a battery impedance testing instrument. Then, the battery was discharged to 3.0 V at a constant current of 1.0 C. The foregoing steps were repeated. Impedance values of the battery during cycles were recorded at frequency of every 10 cycles. Table 4 shows the impedance test results after the 800$^{th}$ cycle.

TABLE 4

| No. | 800-cycles impedance/milliohm |
|---|---|
| Example 1 | 37.7 |
| Example 2 | 37.2 |
| Example 3 | 37.1 |
| Example 4 | 37 |
| Example 5 | 36.9 |
| Example 6 | 36.5 |
| Example 7 | 36.7 |
| Example 8 | 36.8 |
| Example 9 | 37.1 |
| Example 10 | 36.3 |
| Example 11 | 36.2 |
| Example 12 | 36.6 |
| Example 13 | 36.6 |
| Example 14 | 36.5 |
| Example 15 | 36.3 |
| Example 16 | 36.2 |
| Example 17 | 36.2 |

TABLE 4-continued

| No. | 800-cycles impedance/milliohm |
|---|---|
| Example 18 | 36.3 |
| Comparative Example 1 | 55.4 |
| Comparative Example 2 | 50.2 |
| Comparative Example 3 | 43.5 |
| Comparative Example 4 | 53.2 |

It can be seen from the test results of Examples 1-14, Comparative Example 1, and Comparative Example 3 that, the addition of the compound containing a —CN functional group and the compound containing a P—O bond can enhance the protection for the active material and reduce side reactions, thereby improving the cycle impedance performance of the battery.

B. The electrolytic solutions and lithium ion batteries in Examples 19-27 were prepared according to the foregoing preparation method, wherein the contents of the substances in the electrolytic solutions are shown in Table 5.

TABLE 5

| | Compound containing a —CN functional group (wt %) | Compound containing a P—O bond of a phosphorous functional group (wt %) | Cyclic carbonate (wt %) | |
|---|---|---|---|---|
| No. | I-2 | II-5 | FEC | VEC |
| Example 11 | 2 | 0.6 | — | — |
| Example 19 | 2 | 0.6 | 0.1 | — |
| Example 20 | 2 | 0.6 | 2 | — |
| Example 21 | 2 | 0.6 | 4 | — |
| Example 22 | 2 | 0.6 | 6 | — |
| Example 23 | 2 | 0.6 | 8 | — |
| Example 24 | 2 | 0.6 | 10 | — |
| Example 25 | 2 | 0.6 | 15 | — |
| Example 26 | 2 | 0.6 | — | 4 |
| Example 27 | 2 | 0.6 | — | 6 |

"—" represents substance not present.

A 4.4V floatation performance test and a 3.0V storage test were performed on the batteries in Example 11 and Examples 19-27, wherein the process of the 3.0V storage test is as follows:

4. 3.0V Storage Test:

The battery was discharged to 3.0 V at 0.5 C, and after a 5-minute rest, the battery was continued to be discharged to 3.0 V at a current of 0.2 C. The thickness of the battery was measured at this time, and recorded as a reference thickness, marked as $a_2$. Then, the battery was placed into an oven at 60° C. and allowed to stand for 15 days at a voltage of 3 V at a constant temperature. The battery was taken out after 15 days, and the thickness of the battery was measured within 1 h after the battery was taken out. The thickness of the battery at this time was marked as $b_2$. A formula for calculating the thickness swelling rate is as follows: thickness percentage=$(b_2/a_2-1)*100\%$. The thickness of the battery was measured by using a PPG soft pack battery thickness gauge, and the measurement was carried out under a pressure of 300 g. The test results after 15 days are shown in Table 6.

TABLE 6

| No. | 45° C.-4.4 V 50 days floatation thickness swelling rate | 60° C.-3.0 V 15 days thickness swelling rate |
|---|---|---|
| Example 11 | 6.23% | 7.70% |
| Example 19 | 6.20% | 6.00% |
| Example 20 | 6.18% | 5.90% |
| Example 21 | 6.20% | 5.80% |
| Example 22 | 6.18% | 5.71% |
| Example 23 | 6.19% | 5.71% |
| Example 24 | 6.20% | 5.72% |
| Example 25 | 7.21% | 5.74% |
| Example 26 | 6.17% | 5.75% |
| Example 27 | 6.50% | 5.65% |

It can be seen from the test results of Example 11 and Examples 19-27 that, the storage performance of the battery at 3.0 V was significantly improved after the cyclic carbonate was added to the electrolytic solution, due to the excellent film-forming effect of the cyclic carboxylate on the anode.

C. The electrolytic solutions and lithium ion batteries in Examples 28-42 were prepared according to the foregoing preparation method, wherein the contents of the substances in the electrolytic solutions are shown in Table 7.

TABLE 7

| No. | Compound containing a —CN functional group (wt %) | Compound containing a P—O bond (wt %) | Cyclic carbonate (wt %) | Silicon-containing chain carbonate (wt %) | |
|---|---|---|---|---|---|
| | I-2 | II-5 | FEC | IV-1 | IV-2 |
| Comparative Example 1 | — | — | — | — | — |
| Example 11 | 2 | 0.6 | — | — | — |
| Example 22 | 2 | 0.6 | 6 | — | — |
| Example 28 | 2 | 0.6 | — | 1 | — |
| Example 29 | 2 | 0.6 | — | 5 | — |
| Example 30 | 2 | 0.6 | — | 7 | — |
| Example 31 | 2 | 0.6 | — | 10 | — |
| Example 32 | 2 | 0.6 | — | 15 | — |
| Example 33 | 2 | 0.6 | — | 20 | — |
| Example 34 | 2 | 0.6 | — | 50 | — |
| Example 35 | 2 | 0.6 | — | — | 5 |
| Example 36 | 2 | 0.6 | — | — | 7 |
| Example 37 | 2 | 0.6 | 6 | 1 | — |
| Example 38 | 2 | 0.6 | 6 | 5 | — |
| Example 39 | 2 | 0.6 | 6 | 7 | — |
| Example 40 | 2 | 0.6 | 6 | 10 | — |
| Example 41 | 2 | 0.6 | 6 | 20 | — |
| Example 42 | 2 | 0.6 | 6 | 50 | — |

"—" represents substance not present.

A 4.4V floatation performance test, a 3.0V storage test, and a 3 C/7V overcharge test were performed on the lithium ion batteries in Examples 11 and 22 and Examples 28-42, wherein the process of the 3 C/7V overcharge test was as follows:

5. 3 C/7V Overcharge Test:

The battery was discharged to 3.0 V at 0.5 C, and after a 5-minute rest, the battery was charged to 7 V at a current of 3 C. The battery was charged for 1 h at the constant voltage of 7 V. The battery passed the test if it does not burn or explode. The results of the overcharge test are shown in Table 8.

TABLE 8

| No. | 45° C.-4.4 V 50 days floatation thickness swelling rate | 60° C.-3.0 V 15 days thickness swelling rate | 3 C./7 V overcharge test |
|---|---|---|---|
| Comparative Example 1 | 20.5% | 15.6% | 0/5pass |
| Example 11 | 6.23% | 7.70% | 1/5pass |
| Example 22 | 6.18% | 5.71% | 1/5pass |
| Example 28 | 6.18% | 7.71% | 4/5pass |
| Example 29 | 6.19% | 7.73% | 5/5pass |
| Example 30 | 6.20% | 7.80% | 5/5pass |
| Example 31 | 6.19% | 7.91% | 5/5pass |
| Example 32 | 6.18% | 8.10% | 5/5pass |
| Example 33 | 6.20% | 8.30% | 5/5pass |
| Example 34 | 6.19% | 8.90% | 5/5pass |
| Example 35 | 6.18% | 7.75% | 5/5pass |
| Example 36 | 6.19% | 7.80% | 5/5pass |
| Example 37 | 6.18% | 5.72% | 4/5pass |
| Example 38 | 6.19% | 5.74% | 5/5pass |
| Example 39 | 6.20% | 5.80% | 5/5pass |
| Example 40 | 6.18% | 5.90% | 5/5pass |
| Example 41 | 6.19% | 6.00% | 5/5pass |
| Example 42 | 6.20% | 6.50% | 5/5pass |

It can be seen from the test results of Example 11, Example 22, Examples 28-42 and Comparative Example 1 that, the addition of the silicon-containing chain carbonate to the electrolytic solution can significantly improve the overcharge safety performance of the battery.

D. The electrolytic solutions and lithium ion batteries in Examples 43-56 were prepared according to the foregoing preparation method, wherein the contents of the substances in the electrolytic solutions are shown in Table 9.

TABLE 9

| No. | Compound containing a —CN functional group (wt %) | Compound containing a P—O bond (wt %) | Cyclic carbonate (wt %) | Silicon-containing chain carbonate (wt %) | Carboxylate (wt %) | |
|---|---|---|---|---|---|---|
| | I-2 | II-5 | FEC | IV-1 | PP | TFEA |
| Example 11 | 2 | 0.6 | — | — | — | — |
| Example 22 | 2 | 0.6 | 6 | — | — | — |
| Example 38 | 2 | 0.6 | 6 | 5 | — | — |
| Example 43 | 2 | 0.6 | — | — | 5 | — |
| Example 44 | 2 | 0.6 | — | — | 10 | — |
| Example 45 | 2 | 0.6 | — | — | 15 | — |
| Example 46 | 2 | 0.6 | — | — | 20 | — |

TABLE 9-continued

| No. | Compound containing a —CN functional group (wt %) I-2 | Compound containing a P—O bond (wt %) II-5 | Cyclic carbonate (wt %) FEC | Silicon-containing chain carbonate (wt %) IV-1 | Carboxylate (wt %) PP | Carboxylate (wt %) TFEA |
|---|---|---|---|---|---|---|
| Example 47 | 2 | 0.6 | — | — | 30 | — |
| Example 48 | 2 | 0.6 | — | — | 60 | — |
| Example 49 | 2 | 0.6 | — | — | — | 15 |
| Example 50 | 2 | 0.6 | — | — | — | 20 |
| Example 51 | 2 | 0.6 | 6 | — | 15 | — |
| Example 52 | 2 | 0.6 | 6 | — | 20 | — |
| Example 53 | 2 | 0.6 | 6 | 5 | 10 | — |
| Example 54 | 2 | 0.6 | 6 | 5 | 20 | — |
| Example 55 | 2 | 0.6 | 6 | 5 | 30 | — |
| Example 56 | 2 | 0.6 | 6 | 5 | 60 | — |

A 4.4V floatation performance test, a 3.0V storage test, a 3 C/7V overcharge test, and a discharge rate test were performed on the lithium ion batteries in Examples 11, 22, and 38 and Examples 43-56, wherein the process of the discharge rate test is as follows:

6. Discharge Rate Test:

The battery was charged to 4.4 V at 0.2 C at a temperature of 25° C., and then charged to 0.05 C at the constant voltage of 4.4 V. The battery was discharged to 3.0 V at a current of 0.5 C. The discharged capacity was recorded and marked as $a_3$. Then, the battery was charged to 4.4 V at 0.2 C, and charged to 0.05 C at the constant voltage of 4.4 V. The battery was discharged to 3.0 V with a current of 2 C, and the discharged capacity was recorded and marked as $b_3$. The percentage of the capacity discharged with 2 C was calculated based on the capacity discharged with 0.5 C. A calculation formula was as follows: 2 C discharge capacity=$b_3/a_3$*100%. Test results are shown in Table 10.

TABLE 10

| No. | 45° C.-4.4 V 50 days floatation thickness swelling rate | 60° C.-3.0 V 15 days thickness swelling rate | 3 C./7 V overcharge test | 2 C. discharge capacity |
|---|---|---|---|---|
| Example 11 | 6.23% | 7.70% | 1/5pass | 80.1% |
| Example 22 | 6.18% | 5.71% | 1/5pass | 80.1% |
| Example 38 | 6.19% | 5.74% | 5/5pass | 75.4% |
| Example 43 | 6.18% | 7.71% | 1/5pass | 83.2% |
| Example 44 | 6.19% | 7.69% | 1/5pass | 85.4% |
| Example 45 | 6.19% | 7.71% | 1/5pass | 87.2% |
| Example 46 | 6.20% | 7.69% | 1/5pass | 88.1% |
| Example 47 | 6.20% | 7.70% | 1/5pass | 88.2% |
| Example 48 | 6.20% | 7.69% | 1/5pass | 88.5% |
| Example 49 | 6.19% | 7.71% | 1/5pass | 87.2% |
| Example 50 | 6.18% | 7.69% | 1/5pass | 88.2% |
| Example 51 | 6.18% | 5.80% | 1/5pass | 83.2% |
| Example 52 | 6.19% | 6.60% | 1/5pass | 88.1% |
| Example 53 | 6.18% | 5.75% | 5/5pass | 84.0% |
| Example 54 | 6.19% | 6.50% | 4/5pass | 85.1% |
| Example 55 | 6.20% | 7.70% | 4/5pass | 86.6% |
| Example 56 | 6.20% | 9.00% | 3/5pass | 87.5% |

It can be seen from the test results of Example 11, Example 22, Example 38, and Examples 43-56 that, the addition of the carboxylate to the electrolytic solution can significantly improve the 2 C discharge capacity of the battery.

E. The electrolytic solutions and lithium on batteries in Examples 57-79 were prepared according to the foregoing preparation method, wherein the contents of the substances in the electrolytic solutions are shown in Table 11.

TABLE 11

| No. | Compound containing a —CN functional group (wt %) I-2 | Compound containing a P—O bond (wt %) II-5 | Cyclic carbonate (wt %) FEC | Silicon-containing chain carbonate (wt %) IV-1 | Carboxylate (wt %) PP | Lithium salt additive (wt %) $LiPF_4C_2O_2$ | Cesium salt additive (wt %) $CsPF_6$ |
|---|---|---|---|---|---|---|---|
| Example 11 | 2 | 0.6 | — | — | — | — | — |
| Example 22 | 2 | 0.6 | 6 | — | — | — | — |
| Example 38 | 2 | 0.6 | 6 | 5 | — | — | — |
| Example 46 | 2 | 0.6 | — | — | 20 | — | — |
| Example 52 | 2 | 0.6 | 6 | 5 | 20 | — | — |
| Example 57 | 2 | 0.6 | — | — | — | 0.1 | — |
| Example 58 | 2 | 0.6 | — | — | — | 0.3 | — |
| Example 59 | 2 | 0.6 | — | — | — | 0.5 | — |
| Example 60 | 2 | 0.6 | — | — | — | 1 | — |
| Example 61 | 2 | 0.6 | — | — | — | 2 | — |
| Example 62 | 2 | 0.6 | — | — | — | 5 | — |
| Example 63 | 2 | 0.6 | — | — | — | 10 | — |
| Example 64 | 2 | 0.6 | — | — | — | — | 0.1 |

TABLE 11-continued

| No. | Compound containing a —CN functional group (wt %) I-2 | Compound containing a P—O bond (wt %) II-5 | Cyclic carbonate (wt %) FEC | Silicon-containing chain carbonate (wt %) IV-1 | Carboxylate (wt %) PP | Lithium salt additive (wt %) LiPF$_4$C$_2$O$_2$ | Cesium salt additive (wt %) CsPF$_6$ |
|---|---|---|---|---|---|---|---|
| Example 65 | 2 | 0.6 | — | — | — | — | 0.3 |
| Example 66 | 2 | 0.6 | — | — | — | — | 0.5 |
| Example 67 | 2 | 0.6 | — | — | — | — | 1 |
| Example 68 | 2 | 0.6 | 6 | — | — | 0.1 | — |
| Example 69 | 2 | 0.6 | 6 | — | — | 0.3 | — |
| Example 70 | 2 | 0.6 | 6 | — | — | 0.5 | — |
| Example 71 | 2 | 0.6 | 6 | 5 | — | 0.1 | — |
| Example 72 | 2 | 0.6 | 6 | 5 | — | 0.3 | — |
| Example 73 | 2 | 0.6 | 6 | 5 | — | 0.5 | — |
| Example 74 | 2 | 0.6 | — | — | 20 | 0.1 | — |
| Example 75 | 2 | 0.6 | — | — | 20 | 0.3 | — |
| Example 76 | 2 | 0.6 | — | — | 20 | 0.5 | — |
| Example 77 | 2 | 0.6 | 6 | 5 | 20 | 0.1 | — |
| Example 78 | 2 | 0.6 | 6 | 5 | 20 | 0.3 | — |
| Example 79 | 2 | 0.6 | 6 | 5 | 20 | 0.5 | — |

"—" represents substance not present.

A 4.4V floatation performance test, a 3.0V storage test, a 3 C/7V overcharge test, a discharge rate test, and a 25° C. capacity retention rate test were performed on the lithium ion batteries in Examples 11, 22, 38, 46, 52, and 57-79, wherein the process of the 25° C. capacity retention rate test is as follows:

7. 25° C. Cycle Test:

The battery was charged to 4.4 V at 0.7 C at a temperature of 25° C., and then charged to 0.05 C at the constant voltage of 4.4 V. The battery was discharged to 3.0 V at a current of 1 C. The discharged capacity was recorded. The process of charging at 0.7 C and discharging at 1 C was cycled 800 times. The battery capacity discharged in each cycle was recorded. By using the battery capacity discharged in the first cycle as a reference, a percentage of the battery capacity discharged at 1 C in each cycle to the battery capacity discharged in the first cycle was calculated. The test results are shown in Table 12.

TABLE 12

| No. | 45° C.-4.4 V 50 days floatation thickness swelling rate | 60° C.-3.0 V 15 days thickness swelling rate | 3 C./7 V overcharge test | 2 C. discharge capacity | 25° C.-800-cycles capacity retention rate |
|---|---|---|---|---|---|
| Example 11 | 6.23% | 7.70% | 1/5pass | 80.1% | 83.2% |
| Example 22 | 6.18% | 5.71% | 1/5pass | 80.1% | 84.2% |
| Example 38 | 6.19% | 5.74% | 5/5pass | 75.4% | 83.8% |
| Example 46 | 6.20% | 7.71% | 1/5pass | 88.1% | 82.1% |
| Example 52 | 6.19% | 6.50% | 4/5pass | 88.1% | 83.7% |
| Example 57 | 6.19% | 7.65% | 1/5pass | 80.2% | 85.4% |
| Example 58 | 6.20% | 7.60% | 1/5pass | 80.3% | 87.4% |
| Example 59 | 6.19% | 7.51% | 1/5pass | 80.3% | 87.8% |
| Example 60 | 6.20% | 7.40% | 1/5pass | 80.1% | 87.5% |
| Example 61 | 6.18% | 7.31% | 1/5pass | 80.3% | 87.4% |
| Example 62 | 6.19% | 7.32% | 1/5pass | 80.2% | 87.4% |
| Example 63 | 6.18% | 7.41% | 1/5pass | 80.2% | 87.3% |
| Example 64 | 6.19% | 7.64% | 1/5pass | 80.1% | 85.4% |
| Example 65 | 6.20% | 7.55% | 1/5pass | 80.2% | 87.4% |
| Example 66 | 6.19% | 7.48% | 1/5pass | 80.1% | 87.8% |
| Example 67 | 6.20% | 7.35% | 1/5pass | 80.3% | 87.5% |
| Example 68 | 6.19% | 5.61% | 1/5pass | 80.1% | 85.4% |
| Example 69 | 6.18% | 5.55% | 1/5pass | 80.2% | 88.4% |
| Example 70 | 6.19% | 5.51% | 1/5pass | 80.3% | 89.0% |
| Example 71 | 6.19% | 5.71% | 5/5pass | 75.5% | 83.1% |
| Example 72 | 6.18% | 5.65% | 5/5pass | 75.6% | 85.4% |
| Example 73 | 6.19% | 5.60% | 5/5pass | 75.7% | 86.0% |
| Example 74 | 6.20% | 7.65% | 1/5pass | 88.2% | 84.1% |
| Example 75 | 6.20% | 7.60% | 1/5pass | 88.3% | 86.2% |
| Example 76 | 6.20% | 7.55% | 1/5pass | 88.4% | 86.9% |
| Example 77 | 6.19% | 6.40% | 4/5pass | 88.2% | 84.5% |
| Example 78 | 6.19% | 6.35% | 4/5pass | 88.3% | 87.3% |
| Example 79 | 6.20% | 6.3% | 4/5pass | 88.4% | 87.6% |

It can be seen from the test results of Example 11, Example 22, Example 38, Example 46, Example 52, and Examples 57-79 that, after the lithium salt additive and the cesium salt additive were added to the electrolytic solution, the cycle capacity retention rate of the battery can be significantly improved. The reason may be that the combination of the lithium salt and the cesium salt with the compound containing a —CN functional group and the compound containing a P—O bond enhances the protection effect of the electrolytic solution to the active material of the battery.

F. The electrolytic solutions and lithium ion batteries in Examples 80-84 were prepared according to the foregoing preparation method, wherein the contents of the substances in the electrolytic solutions are shown in Table 13.

TABLE 13

| No. | Compound containing a —CN functional group I-2 | Compound containing a P—O bond II-5 | Additive | | | | |
|---|---|---|---|---|---|---|---|
| | | | Butane-dinitrile | 1,3-dioxolan | Diethoxy-methane | Trimethyl phosphate | Fluoro-benzene |
| Example 11 | 2 | 0.6 | — | — | — | — | — |
| Example 80 | 2 | 0.6 | 3 | — | — | — | — |
| Example 81 | 2 | 0.6 | — | 1 | — | — | — |
| Example 82 | 2 | 0.6 | — | — | 3 | — | — |
| Example 83 | 2 | 0.6 | — | — | — | 4 | — |
| Example 84 | 2 | 0.6 | — | — | — | — | 6 |

"—" represents substance not present.

A 4.4V floatation performance test, a hot box test, and a 3 C/6V overcharge test were performed on the lithium ion batteries in Examples 11 and 80-84, wherein the processes of the hot box test and 3 C/6V overcharge test were as follows:

8. Hot Box Test:

The battery was charged to 4.4 V at 0.7 C at a temperature of 25° C. and then charged to 0.05 C at the constant voltage of 4.4 V. Next, the battery was placed into a test chamber, and the test chamber was heated at a rate of (5±2) ° C./min. When the temperature in the box reached 150° C.±2° C., the temperature was maintained for 60 min. The battery passed the test if it did not burn or explode. 9. Overcharge Test:

The battery was charged to 6 V at 3 C at a temperature of 25° C. and then charged at the constant voltage of 6 V. Temperature changes of the battery were detected during the test. The test was terminated upon occurrence of one of the following two situations:

a) a continuous charging time of the battery reached 7 h; and b) the temperature of the battery lowered to a value that was 20% less than a peak value.

The battery passed the test if it did not burn or explode.

The results of the hot box test and the overcharge test are shown in Table 14:

TABLE 14

| No. | 45° C.-4.4 V 50 days floatation thickness swelling rate | Hot box test | 3 C./6 V overcharge test |
|---|---|---|---|
| Example 11 | 6.23% | 4/5pass | 3/5pass |
| Example 80 | 5.80% | 5/5pass | 4/5pass |
| Example 81 | 6.10% | 4/5pass | 5/5pass |
| Example 82 | 6.20% | 4/5pass | 5/5pass |

TABLE 14-continued

| No. | 45° C.-4.4 V 50 days floatation thickness swelling rate | Hot box test | 3 C./6 V overcharge test |
|---|---|---|---|
| Example 83 | 6.21% | 5/5pass | 5/5pass |
| Example 84 | 6.21% | 3/5pass | 4/5pass |

It can be seen from the test results of Example 11 and Examples 80-84 that the additive in combination with the compound containing a —CN functional group and the compound containing a P—O bond can improve the safety performance of the battery to some extent.

Described above are merely some embodiments of the present invention, and are not intended to limit the present invention in any form. Although the present invention is disclosed above with exemplary embodiments, the present invention is not limited thereto. Changes or modifications made by any person skilled in the art according to the technical content disclosed above and without departing from the scope of the technical solutions of the present invention are all equivalent to equivalent embodiments, and all fall within the scope of the technical solutions.

References throughout the specification to "embodiments", "partial embodiments", "one embodiment", "another example", "example", "specific example" or "partial examples" mean that at least one embodiment or example of the application includes specific features, structures, materials or characteristics described in the embodiments or examples. Thus, the descriptions appear throughout the specification, such as "in some embodiments", "in an embodiment", "in one embodiment", "in another example", "in an example", "in a particular example" or "for example", are not necessarily the same embodiment or example in the application. Furthermore, the particular features, structures, materials or characteristics herein may be combined in any suitable manner in one or more embodiments or examples.

While the illustrative embodiments have been shown and described, it will be understood by a person skilled in the art that the embodiments are not to be construed as limiting the this application, and modifications, substitutions and changes can be made to the embodiments without departing from the spirit, principle, and scope of the this application.

What is claimed is:

1. An electrolytic solution, comprising a compound containing a —CN functional group and a compound containing a P—O bond, wherein the compound containing a P—O bond comprises at least one selected from the group consisting of a compound represented by formula II-A and a compound represented by formula II-B:

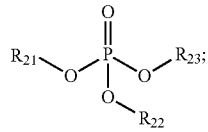
(II-A)

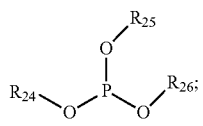
(II-B)

wherein $R_{21}$, $R_{22}$, $R_{23}$, $R_{24}$, and $R_{25}$ are each independently selected from $R^a$, Si—$(R'')_3$, or R'—Si—$(R'')_3$;

wherein $R_{26}$ is selected from a $C_1$-$C_{12}$ alkyl group, a $C_2$-$C_{12}$ alkenyl group, a $C_6$-$C_{10}$ cyclic hydrocarbon group, or a $C_6$-$C_{26}$ aryl group;

each of $R^a$ and R" is independently selected from a $C_1$-$C_{12}$ alkyl group, a $C_2$-$C_{12}$ alkenyl group, a $C_6$-$C_{10}$ cyclic hydrocarbon group, or a $C_6$-$C_{26}$ aryl group;

R' is selected from a $C_1$-$C_{12}$ alkylene group or a $C_2$-$C_{12}$ alkenylene group; and $R_{21}$, $R_{22}$, $R_{23}$, $R_{24}$, $R_{25}$, and $R_{26}$ are each independently substituted or non-substituted, and when being substituted, a substituent is selected from a halogen, a $C_1$-$C_6$ alkyl group, a $C_2$-$C_6$ alkenyl group, or any combination thereof;

wherein based on a total weight of the electrolytic solution, a weight percentage of the compound containing a —CN functional group is A %, and a weight percentage of the compound containing a P—O bond is B %, wherein 0.5≤A/B≤5;

wherein the compound containing a —CN functional group comprises at least one selected from the group consisting of a compound represented by formula I-2 and a compound represented by formula I-10:

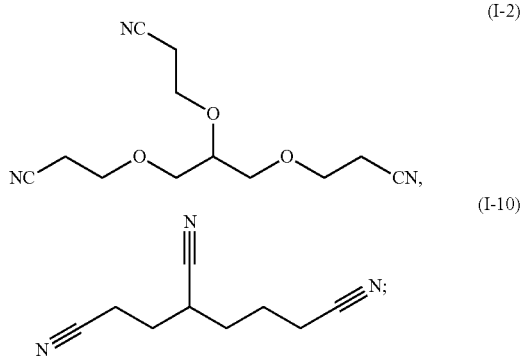
(I-2)

(I-10)

wherein the electrolytic solution further includes a dinitrile compound;

wherein the dinitrile compound comprises at least one selected from the group consisting of butanedinitrile, hexanedinitrile, and ethyleneglycoldi(2-cyanoethyl) ether.

2. The electrolytic solution according to claim 1, wherein the compound containing a P—O bond comprises a compound represented by formula II-5:

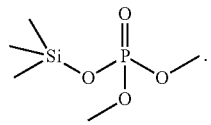
(II-5)

3. The electrolytic solution according to claim 1, wherein based on the total weight of the electrolytic solution, the weight percentage of the compound containing a —CN functional group is about 1 wt % to 3 wt %, and the weight percentage of the compound containing a P—O bond is about 0.1 wt % to 2 wt %.

4. The electrolytic solution according to claim 1, further comprising a cyclic carbonate, the cyclic carbonate comprising a compound represented by formula III-A:

(III-A)

wherein $R_{31}$ is selected from a substituted or non-substituted $C_1$-$C_{12}$ alkylene group, or a substituted or non-substituted $C_2$-$C_{12}$ alkenylene group; and when being substituted, a substituent is selected from a halogen, a $C_1$-$C_6$ alkyl group, a $C_2$-$C_6$ alkenyl group or any combination thereof.

5. The electrolytic solution according to claim 1, further comprising a carbonate compound containing a silicon functional group, wherein the carbonate compound containing a silicon functional group comprises at least one of the following compounds:

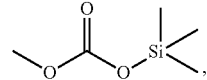
(formula IV-1)

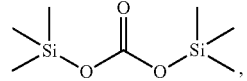
(formula IV-2)

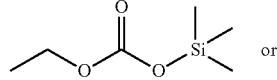
(formula IV-3) or

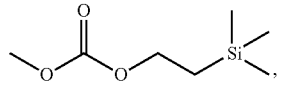
(formula IV-4)

based on the total weight of the electrolytic solution, the weight percentage of the carbonate compound containing a silicon functional group is about 0.01 wt % to about 50 wt %.

6. The electrolytic solution according to claim 1, wherein the compound containing a —CN functional group comprises a compound represented by formula I-2:

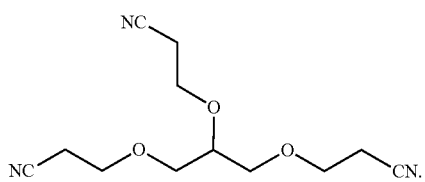

7. The electrolytic solution according to claim 1, wherein the compound containing a —CN functional group comprises a compound represented by formula I-2:

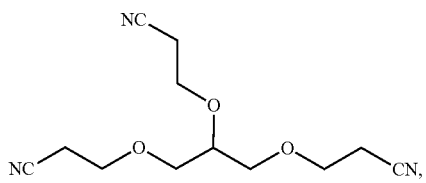

wherein the dinitrile compound comprises butanedinitrile.

8. The electrolytic solution according to claim 1, further comprising a carboxylate, wherein the carboxylate comprises at least one of the following compounds: propylpropionate, trifluoroethylacetate or fluoroethylacetate; and
   wherein based on the total weight of the electrolytic solution, the content of the carboxylate is about 0.01 wt % to about 60 wt %.

9. An electrochemical device, comprising an electrolytic solution, wherein the electrolytic solution comprises a compound containing a —CN functional group and a compound containing a P—O bond,
   wherein the compound containing a P—O bond comprises at least one selected from the group consisting of a compound represented by formula II-A and a compound represented by formula II-B:

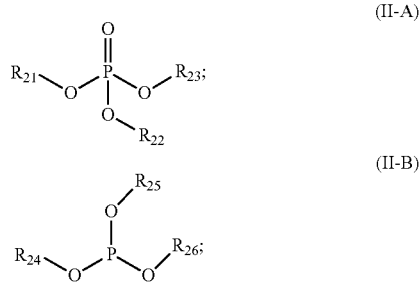

wherein $R_{21}$, $R_{22}$, $R_{23}$, $R_{24}$, and $R_{25}$ are each independently selected from $R^a$, Si—(R")$_3$, or R'—Si—(R")$_3$;
wherein $R_{26}$ is selected from a $C_1$-$C_{12}$ alkyl group, a $C_2$-$C_{12}$ alkenyl group, a $C_6$-$C_{10}$ cyclic hydrocarbon group, or a $C_6$-$C_{26}$ aryl group;
each of $R^a$ and R" is independently selected from a $C_1$-$C_{12}$ alkyl group, a $C_2$-$C_{12}$ alkenyl group, a $C_6$-$C_{10}$ cyclic hydrocarbon group, or a $C_6$-$C_{26}$ aryl group;
R' is selected from a $C_1$-$C_{12}$ alkylene group or a $C_2$-$C_{12}$ alkenylene group; and
$R_{21}$, $R_{22}$, $R_{23}$, $R_{24}$, $R_{25}$, and $R_{26}$ are each independently substituted or non-substituted, and when being substituted, a substituent is selected from a halogen, a $C_1$-$C_6$ alkyl group, a $C_2$-$C_6$ alkenyl group, or any combination thereof;
wherein based on a total weight of the electrolytic solution, a weight percentage of the compound containing a —CN functional group is A %, and a weight percentage of the compound containing a P—O bond is B %, wherein $0.5 \leq A/B \leq 5$;
wherein the compound containing a —CN functional group comprises at least one selected from the group consisting of a compound represented by formula I-2 and a compound represented by formula I-10:

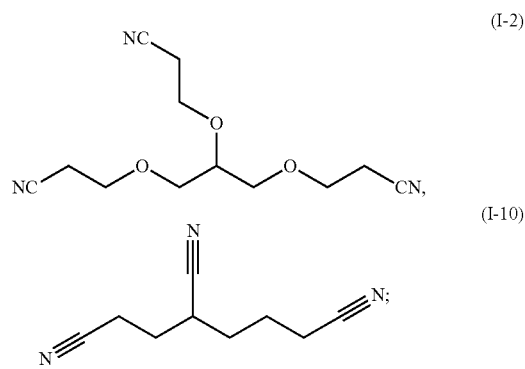

wherein the electrolytic solution further includes a dinitrile compound;
wherein the dinitrile compound comprises at least one selected from the group consisting of butanedinitrile, hexanedinitrile, and ethyleneglycoldi(2-cyanoethyl) ether.

10. The electrochemical device according to claim 9, wherein the electrolytic solution further comprises a cyclic carbonate, the cyclic carbonate comprising a compound represented by formula III-A:

wherein $R_{31}$ is selected from a substituted or non-substituted $C_1$-$C_{12}$ alkylene group, or a substituted or non-substituted $C_2$-$C_{12}$ alkenylene group; and
when being substituted, a substituent is selected from a halogen, a $C_1$-$C_6$ alkyl group, a $C_2$-$C_6$ alkenyl group or any combination thereof.

11. The electrochemical device according to claim 9, wherein the compound containing a —CN functional group comprises a compound represented by formula I-2:

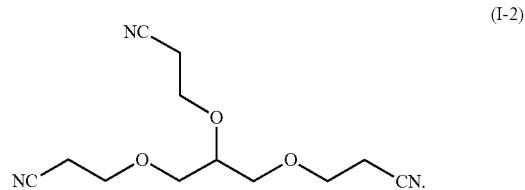 [SMILES: N#CCCOCC(COCCC#N)OCCC#N]

12. The electrochemical device according to claim 11, further comprising a carbonate compound containing a silicon functional group,
wherein the carbonate compound containing a silicon functional group comprises at least one of the following compounds:

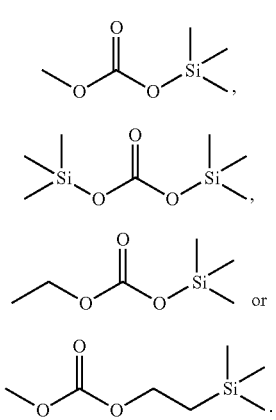

(formula IV-1)

(formula IV-2)

(formula IV-3) or (formula IV-4)

13. The electrochemical device according to claim 9, wherein the compound containing a P—O bond comprises a compound represented by formula II-5:

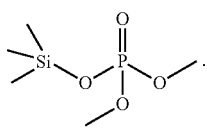

(II-5)

14. The electrochemical device according to claim 9, wherein the compound containing a —CN functional group comprises a compound represented by formula I-2:

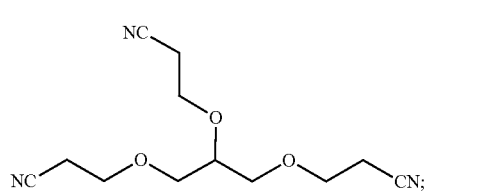

(I-2)

wherein the dinitrile compound comprises butanedinitrile.

15. The electrochemical device according to claim 9, wherein based on the total weight of the electrolytic solution, the weight percentage of the compound containing a —CN functional group is 1 wt % to 3 wt %, and the weight percentage of the compound containing a P—O bond is 0.1 wt % to 2 wt %.

16. The electrochemical device according to claim 9, further comprising a carboxylate, wherein the carboxylate comprises at least one of the following compounds: propylpropionate, trifluoroethylacetate or fluoroethylacetate;
wherein based on the total weight of the electrolytic solution, the content of the carboxylate is about 0.01 wt % to about 60 wt %.

17. An electronic device, comprising an electrochemical device comprising an electrolytic solution, wherein the electrolytic solution comprises a compound containing a —CN functional group and a compound containing a P—O bond,
wherein the compound containing a P—O bond comprises at least one selected from the group consisting of a compound represented by formula II-A and a compound represented by formula II-B:

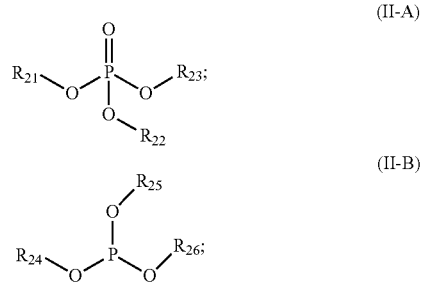

(II-A)

(II-B)

wherein $R_{21}$, $R_{22}$, $R_{23}$, $R_{24}$, and $R_{25}$ are each independently selected from $R^a$, Si—$(R'')_3$, or R'—Si—$(R'')_3$;

wherein $R_{26}$ is selected from a $C_1$-$C_{12}$ alkyl group, a $C_2$-$C_{12}$ alkenyl group, a $C_6$-$C_{10}$ cyclic hydrocarbon group, or a $C_6$-$C_{26}$ aryl group;

each of $R^a$ and R'' is independently selected from a $C_1$-$C_{12}$ alkyl group, a $C_2$-$C_{12}$ alkenyl group, a $C_6$-$C_{10}$ cyclic hydrocarbon group, or a $C_6$-$C_{26}$ aryl group;

R' is selected from a $C_1$-$C_{12}$ alkylene group or a $C_2$-$C_{12}$ alkenylene group; and $R_{21}$, $R_{22}$, $R_{23}$, $R_{24}$, $R_{25}$, and $R_{26}$ are each independently substituted or non-substituted, and when being substituted, a substituent is selected from a halogen, a $C_1$-$C_6$ alkyl group, a $C_2$-$C_6$ alkenyl group, or any combination thereof;

wherein based on a total weight of the electrolytic solution, a weight percentage of the compound containing a —CN functional group is A %, and a weight percentage of the compound containing a P—O bond is B %, wherein 0.5≤A/B≤5;

wherein the compound containing a —CN functional group comprises at least one selected from the group consisting of a compound represented by formula I-2 and a compound represented by formula I-10:

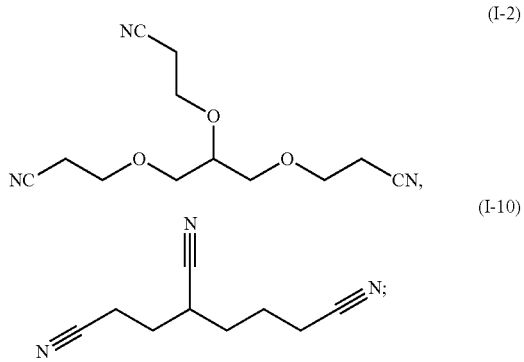

(I-2)

(I-10)

wherein the electrolytic solution further includes a dinitrile compound;

wherein the dinitrile compound comprises at least one selected from the group consisting of butanedinitrile, hexanedinitrile, and ethyleneglycoldi(2-cyanoethyl) ether.

* * * * *